(12) United States Patent
Flitsch et al.

(10) Patent No.: US 11,505,902 B2
(45) Date of Patent: Nov. 22, 2022

(54) METHODS, MATERIALS AND APPARATUS FOR MOBILE ADDITIVE MANUFACTURING OF ADVANCED STRUCTURES AND ROADWAYS

(71) Applicants: Robert A. Flitsch, New Windsor, NY (US); Frederick A. Flitsch, Seattle, WA (US)

(72) Inventors: Robert A. Flitsch, New Windsor, NY (US); Frederick A. Flitsch, Seattle, WA (US)

(*) Notice: Subject to any disclaimer, the term of this patent is extended or adjusted under 35 U.S.C. 154(b) by 74 days.

(21) Appl. No.: 17/200,559

(22) Filed: Mar. 12, 2021

(65) Prior Publication Data

US 2021/0214901 A1 Jul. 15, 2021

Related U.S. Application Data

(63) Continuation-in-part of application No. 16/878,136, filed on May 19, 2020, which is a continuation of
(Continued)

(51) Int. Cl.
*B33Y 50/02* (2015.01)
*B33Y 30/00* (2015.01)
(Continued)

(52) U.S. Cl.
CPC ............. *E01C 19/17* (2013.01); *B33Y 10/00* (2014.12); *B33Y 30/00* (2014.12); *B33Y 50/02* (2014.12); *G05D 1/0219* (2013.01)

(58) Field of Classification Search
CPC ........ E01C 19/17; E01C 19/004; E01C 23/07; E01C 23/0966; E01C 23/0973;
(Continued)

(56) References Cited

U.S. PATENT DOCUMENTS 2,082,259 A 6/1937 Peden
2,126,869 A 8/1938 William et al.
(Continued)

FOREIGN PATENT DOCUMENTS

CN 202202237 U 4/2012
CN 102953312 A 3/2013
(Continued)

OTHER PUBLICATIONS

A. Cubero-Fernandez, J. Rodriguez-Lozano, R. Villatoro, J. Olivares and J. Palomares, "Efficientpavement crack detection and classification," EURASIP Journal on Image and Video Processing, 2017 (Year: 2017).
(Continued)

*Primary Examiner* — Nahida Sultana

(57) ABSTRACT

The present disclosure provides various aspects for mobile and automated processing utilizing additive manufacturing and the methods for their utilization. In some examples, discrete material formats for use in an Additive Manufacturing Array are disclosed. Methods of using the additive manufacturing robot, discrete materials, and the roadways produced with the additive manufacturing robot are provided. A combined function Addibot, with Additive Manufacturing capabilities, cleaning capabilities, line painting capabilities and seal coating capabilities which may be used in concert with a camera equipped aerial drone for design and characterization function is described.

20 Claims, 17 Drawing Sheets

Related U.S. Application Data application No. 16/324,058, filed as application No. PCT/US2018/046749 on Aug. 14, 2018, now Pat. No. 10,697,134, and a continuation-in-part of application No. 16/078,221, filed as application No. PCT/US2017/018167 on Feb. 16, 2017, now Pat. No. 11,194,306, and a continuation-in-part of application No. 15/029,475, filed as application No. PCT/US2016/027309 on Apr. 13, 2016, now Pat. No. 11,194,306.

(60) Provisional application No. 62/334,783, filed on May 11, 2016, provisional application No. 62/322,169, filed on Apr. 13, 2016, provisional application No. 62/299,405, filed on Feb. 24, 2016, provisional application No. 62/296,504, filed on Feb. 17, 2016, provisional application No. 62/286,836, filed on Jan. 25, 2016, provisional application No. 62/148,035, filed on Apr. 15, 2015.

(51) Int. Cl.
  *B33Y 10/00* (2015.01)
  *E01C 19/17* (2006.01)
  *G05D 1/02* (2020.01)

(58) Field of Classification Search
  CPC ....... E01C 23/098; B33Y 10/00; B33Y 30/00; B33Y 50/02; G05D 1/0219; G05D 2201/0202; G05D 1/0246; B29C 64/20; B29C 64/393; B29C 64/227; G06K 9/6221; G06K 9/627; G06V 10/763
  See application file for complete search history.

(56) References Cited

U.S. PATENT DOCUMENTS

| | | | |
|---|---|---|---|
| 4,842,441 A | 6/1989 | Watkins | |
| 4,881,361 A | 11/1989 | Dalton | |
| 5,217,653 A | 6/1993 | Mashinsky et al. | |
| 5,294,210 A | 3/1994 | Lemelson | |
| 5,333,969 A | 8/1994 | Blaha et al. | |
| 5,439,313 A | 8/1995 | Blaha et al. | |
| 5,614,670 A | 3/1997 | Nazarian et al. | |
| 6,186,700 B1 | 2/2001 | Omann | |
| 6,206,607 B1 | 3/2001 | Medico, Jr. et al. | |
| 6,299,934 B1 | 10/2001 | Manning | |
| 6,391,251 B1 | 5/2002 | Keicher et al. | |
| 7,445,441 B2 | 11/2008 | West et al. | |
| 8,414,280 B2 | 4/2013 | Pettis | |
| 9,231,498 B2 | 1/2016 | Hashimoto et al. | |
| 9,255,364 B2 | 2/2016 | Ichikawa | |
| 9,303,368 B2 | 4/2016 | Reda | |
| 9,637,870 B1 | 5/2017 | Coe | |
| 9,903,078 B2 | 2/2018 | Ali | |
| 9,948,898 B2 | 4/2018 | Barfield et al. | |
| 9,970,758 B2 | 5/2018 | Shah et al. | |
| 10,066,348 B2 | 9/2018 | Yun et al. | |
| 10,087,589 B2 | 10/2018 | Yun et al. | |
| 10,190,269 B2 | 1/2019 | Shah et al. | |
| 2001/0020058 A1 | 9/2001 | Kamaishi et al. | |
| 2003/0069668 A1 | 4/2003 | Zurn | |
| 2005/0065400 A1 | 3/2005 | Banik et al. | |
| 2006/0240183 A1 | 10/2006 | Pollard et al. | |
| 2006/0258912 A1 | 11/2006 | Belson et al. | |
| 2007/0164641 A1 | 7/2007 | Pelrine et al. | |
| 2008/0253834 A1 | 10/2008 | Colvard | |
| 2008/0276834 A1 | 11/2008 | Jorda | |
| 2009/0000323 A1 | 1/2009 | Walker | |
| 2010/0041795 A1 | 2/2010 | Wilson, Jr. | |
| 2010/0121476 A1 | 5/2010 | Kritchman | |
| 2010/0275817 A1 | 11/2010 | Williams et al. | |
| 2011/0089610 A1 | 4/2011 | El-Siblani et al. | |
| 2011/0146111 A1 | 6/2011 | Pender | |
| 2011/0219899 A1 | 9/2011 | Dize et al. | |
| 2011/0233105 A1 | 9/2011 | Bailey | |
| 2012/0031724 A1 | 2/2012 | Noll et al. | |
| 2013/0051913 A1 | 2/2013 | Eul | |
| 2013/0295338 A1 | 11/2013 | Keating et al. | |
| 2014/0084517 A1 | 3/2014 | Sperry et al. | |
| 2014/0203479 A1 | 7/2014 | Teken et al. | |
| 2014/0232035 A1 | 8/2014 | Bheda | |
| 2014/0268604 A1 | 9/2014 | Wicker et al. | |
| 2014/0374933 A1 | 12/2014 | Flitsch et al. | |
| 2015/0079214 A1 | 3/2015 | Shi et al. | |
| 2015/0132425 A1 | 5/2015 | Lacaze et al. | |
| 2015/0140150 A1 | 5/2015 | Schmehl et al. | |
| 2015/0171305 A1 | 6/2015 | Hashimoto et al. | |
| 2016/0032536 A1 | 2/2016 | Reda | |
| 2016/0032540 A1 | 2/2016 | Reda | |
| 2016/0093212 A1 | 3/2016 | Barfield et al. | |
| 2016/0136730 A1 | 5/2016 | McMurtry et al. | |
| 2016/0209511 A1 | 7/2016 | Dolinar et al. | |
| 2016/0229124 A1 | 8/2016 | Koshikawa | |
| 2016/0236411 A1 | 8/2016 | Ohnishi | |
| 2016/0325498 A1 | 11/2016 | Gelbart | |
| 2017/0001379 A1 | 1/2017 | Long | |
| 2017/0129180 A1 | 5/2017 | Coates et al. | |
| 2017/0136697 A1 | 5/2017 | Kia et al. | |
| 2017/0145640 A1 | 5/2017 | Coe | |
| 2017/0204569 A1 | 7/2017 | Shah et al. | |
| 2017/0226709 A1 | 8/2017 | Ali | |
| 2017/0238595 A1 | 8/2017 | Atureliya | |
| 2017/0246684 A1 | 8/2017 | Hellestam | |
| 2017/0298580 A1 | 10/2017 | Flitsch et al. | |
| 2017/0305137 A1 | 10/2017 | Flitsch et al. | |
| 2017/0314918 A1 | 11/2017 | Shah et al. | |
| 2017/0342669 A1 | 11/2017 | Yun et al. | |
| 2017/0350698 A1 | 12/2017 | Shah et al. | |
| 2017/0370053 A1 | 12/2017 | Yun et al. | |
| 2017/0372480 A1 | 12/2017 | Anand et al. | |
| 2018/0297115 A1 | 10/2018 | Diwinsky et al. | |
| 2018/0370148 A1 | 12/2018 | Sekine et al. | |
| 2019/0055699 A1 | 2/2019 | Flitsch et al. | |
| 2019/0111619 A1 | 4/2019 | Schalk et al. | |
| 2019/0147331 A1 | 5/2019 | Arditi | |
| 2019/0154442 A1 | 5/2019 | Annovi et al. | |
| 2019/0160743 A1 | 5/2019 | Matsubara et al. | |
| 2019/0188501 A1 | 6/2019 | Ryu | |
| 2019/0240912 A1 | 8/2019 | Alves | |
| 2021/0039308 A1* | 2/2021 | Flitsch | B22F 10/18 |

FOREIGN PATENT DOCUMENTS

| | | |
|---|---|---|
| EP | 2772626 A1 | 9/2014 |
| WO | 2009048828 A1 | 4/2009 |
| WO | 2012087150 A1 | 6/2012 |

OTHER PUBLICATIONS

G. Younes, C. Attia and Z. Djelloul, "Supervised learning and automatic recognition of asphalt pavement deteriorations," In Proc. 2009 IEEE/ACS International Conference on ComputerSystems and Applications, pp. 205-210, 2009 (Year: 2009).

L. Marques, R. Williams, W. Zhou, "A Mobile 3D Printer for Cooperative 3D Printing," In Proc. 28th Annual International Solid Freeform Fabrication Symposium, pp. 1645-1660, 2017 (Year: 2017).

* cited by examiner

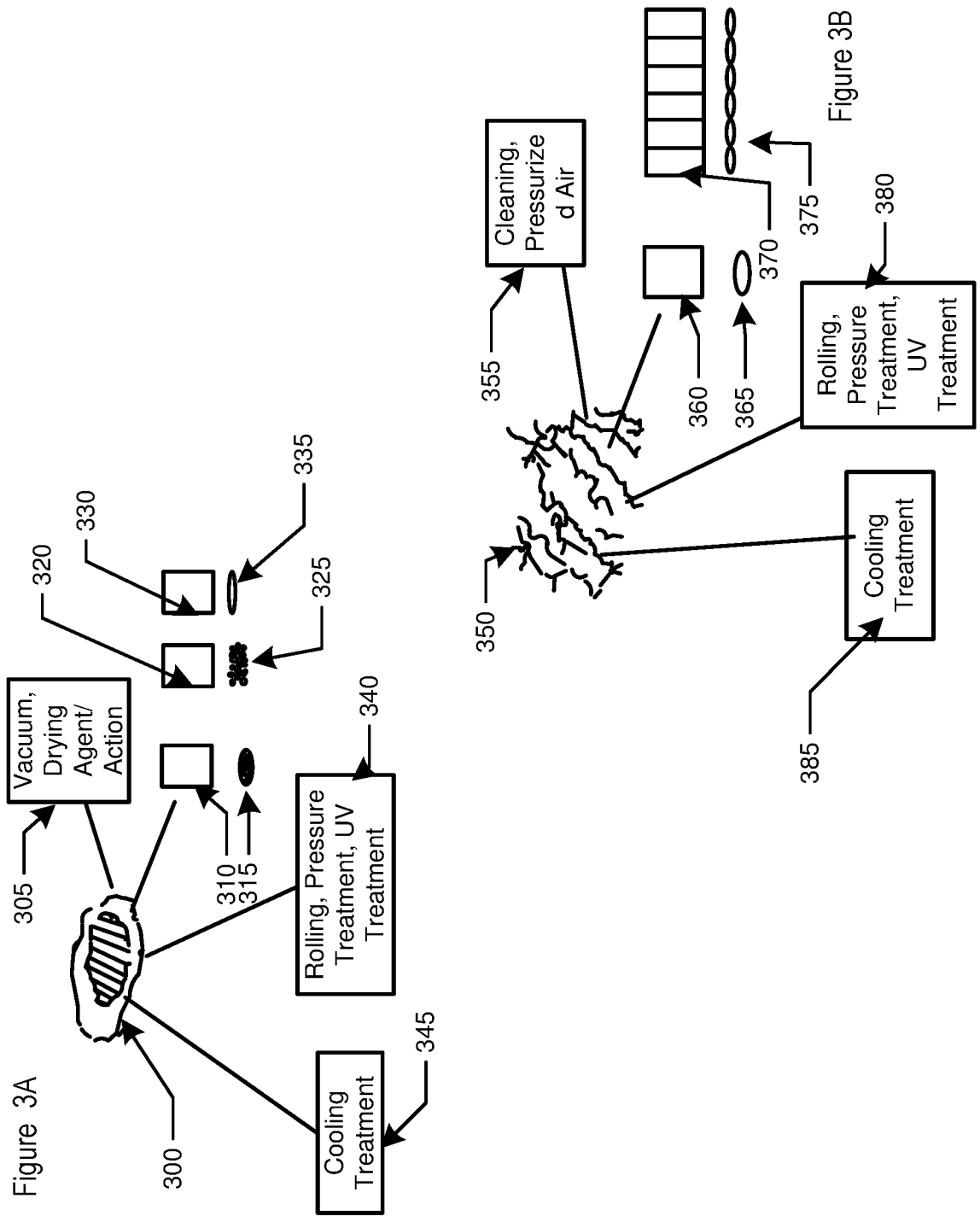

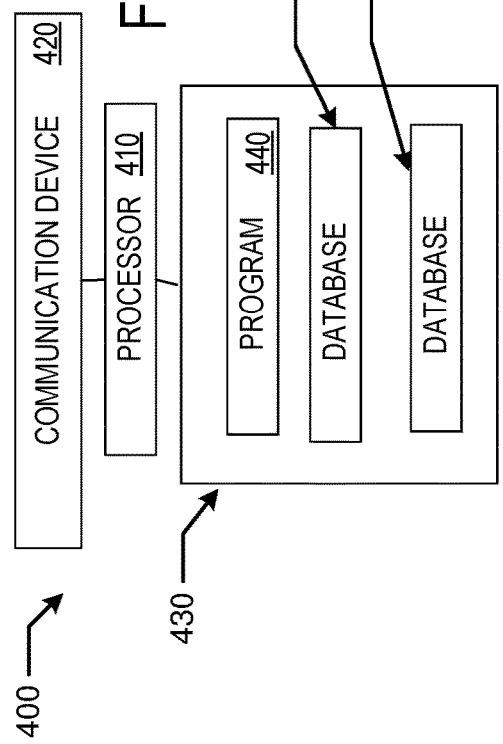
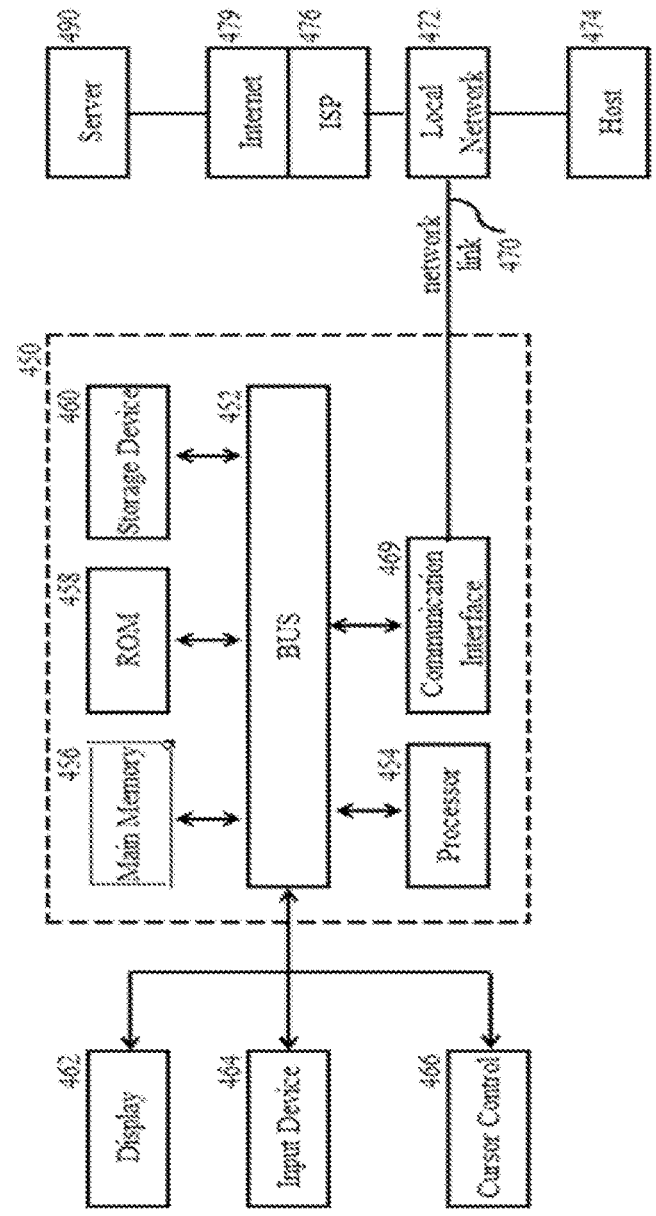

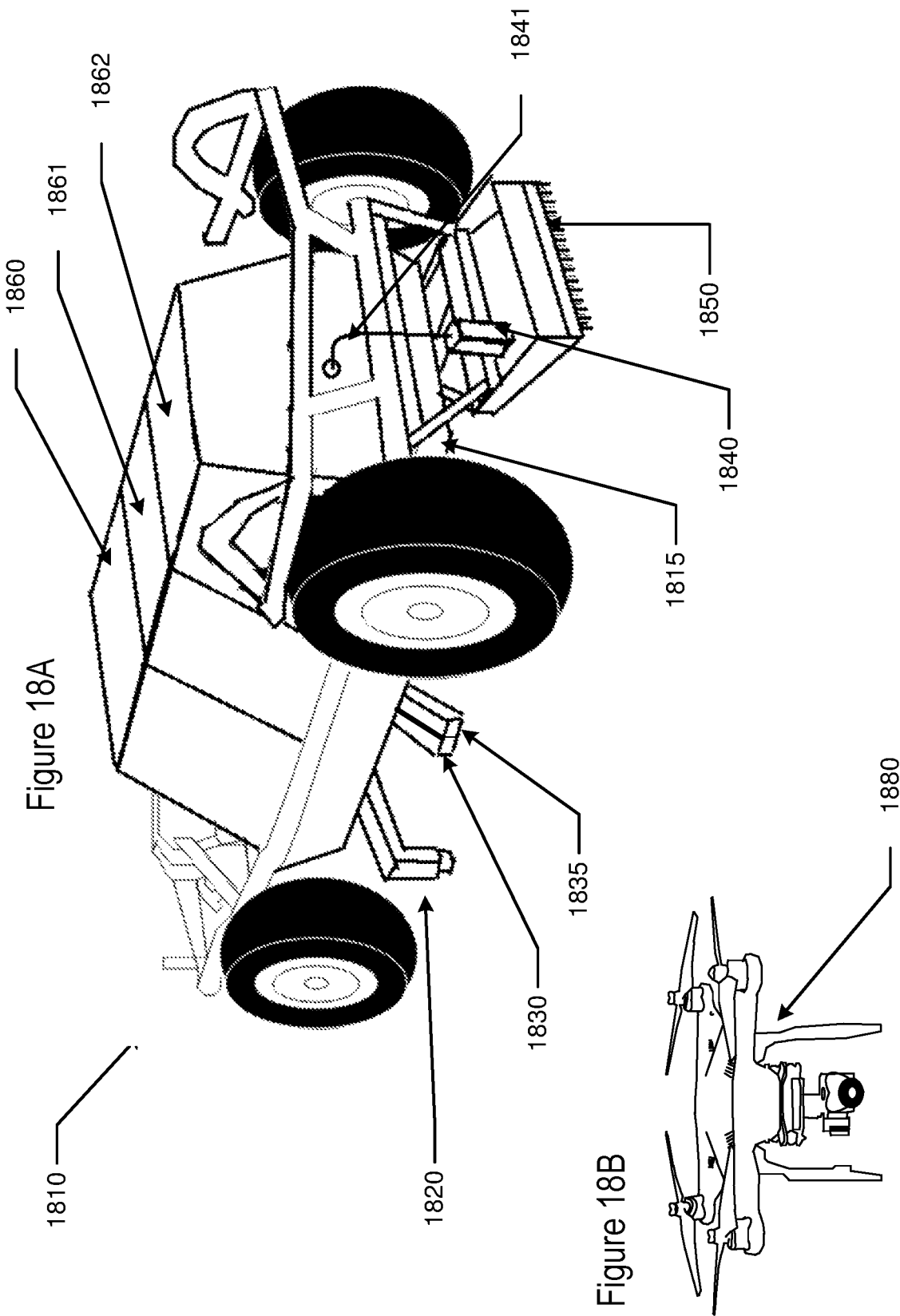

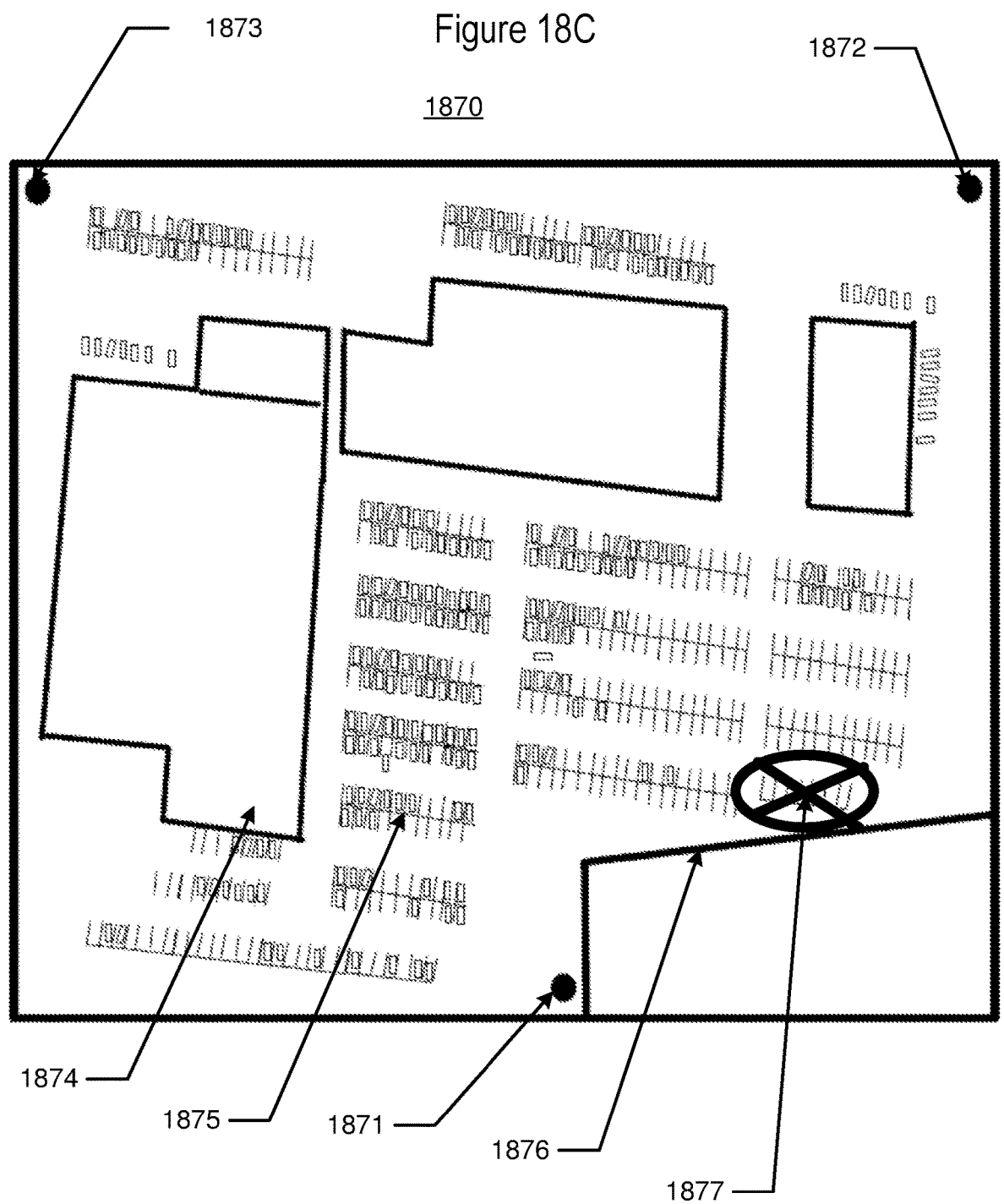

METHODS, MATERIALS AND APPARATUS FOR MOBILE ADDITIVE MANUFACTURING OF ADVANCED STRUCTURES AND ROADWAYS

CROSS REFERENCE TO RELATED APPLICATION

This application claims priority as a continuation in part to U.S. Non-Provisional application Ser. No. 16/078,221 filed on Aug. 21, 2018 which in turn is a national stage entry of the PCT application PCT/US17/18167, filed on Feb. 16, 2017 which in turn claims the benefit of the U.S. Provisional Application Ser. 62/296,504 filed on Feb. 17, 2016 as well as the U.S. Provisional Application Ser. 62/299,405 filed on Feb. 24, 2016 as well as the U.S. Provisional Application Ser. 62/322,169 filed on Apr. 13, 2016 and to the U.S. Provisional Application Ser. 62/334,783 filed on May 11, 2016. This application also claims priority as a continuation in part to U.S. Non-Provisional application Ser. No. 15/029,475 filed on May 8, 2017 which in turn claims the benefit of U.S. Provisional Application Ser. 62/286,836 filed on Jan. 25, 2016 as well as the U.S. Provisional Application Ser. 62/148,035 filed on Apr. 15, 2015. This application also claims priority as a continuation in part to U.S. Non-Provisional application Ser. No. 16/878,136 filed on May 19, 2020 which in turn claims priority as a continuation of the U.S. Non-Provisional application Ser. No. 16/324,058 filed Feb. 7, 2019. The contents of each of the above are relied upon and incorporated by reference.

FIELD OF THE INVENTION

The present disclosure relates to methods and apparatus that support mobile additive material processing. Robotic and human controlled mobility may be combined with additive manufacturing techniques that "print" or additively deliver materials to specific locations over distances. The methods and apparatus may be applied to the productions of advanced building structures and roadways.

BACKGROUND OF THE INVENTION

A known class of approaches to material fabrication can be classified as additive manufacturing. Material in various forms, including solid, powder, gel, gas, or liquid forms may be processed in such a manner to deposit or lock in material in a target location in space.

Numerous techniques may be utilized to perform additive manufacturing. In extrusion processes materials in wire or filament form are controlled by an extrusion head which may be moved above a work area. The use of multiple extrusion heads and extrusion material may allow for both permanent and temporary structures to be formed. By building the extruded material in layers or in regions complex shapes may be formed in three dimensions. However, the technology is limited by the dimensions of the workspace—the ability of the head or heads to move in the two dimensions of a plane and also by the dimension of the ability of the head to move vertically relative to a planar support structure. There may be numerous variations on this form of additive manufacturing.

A different class of additive manufacturing may be classified as Stereolithography. In this class, a light or heat source is used to transform the material in space. In some Stereolithography implementations, the work support plane is submerged in a photoactive or thermo-active liquid and a laser or other light or heat source is rastered across a thin surface layer of the liquid between the support structure and the top level of the liquid. By translating the support structure down a layer, into the liquid the fluent nature of the liquid reforms a thin layer of new unreacted material over the work surface or the previously processed layer.

Versions of Stereolithography may also work with powder formed starting material. The powder may be shaped into a thin layer and then a spatially defined. Lasers may be used to transform portions of the layer into a solidified material. In other examples, other energy sources such as, for example, electron beams, may be used to transform the powder. Various materials including metals, insulators and plastics may be formed into three dimensional shapes by these processing techniques.

A different type of processing occurs when a print head is used to deposit material onto the powder. The deposit may chemically react with the powder or may be an adhesive that consolidates the powder into an adhered location. The prevalence of high resolution printing technology may make this type of additive manufacturing process cost effective.

The field is both established, with versions of additive manufacturing being practiced for decades; and emerging, with new techniques and materials being defined with rapidity. The technology may be currently limited by the dimensions of objects that may be produced and limits on size that are placed by the size of the additive manufacturing equipment. Accordingly, it may be desirable to develop methods and apparatus that may allow additive manufacturing techniques and apparatus to be independently mobile. It may also be desirable to apply the techniques in new manners to the fabrication of advanced building structures and roadways.

SUMMARY OF THE INVENTION

Accordingly, the present disclosure provides description for methods and apparatus that allow for mobile additive manufacturing and the application of these techniques to the production of advanced building structures and advanced roadways. In some examples, the mobile additive manufacturing apparatus make act in an independent or automated manner. The apparatus that performs the mobile additive manufacturing may be called an Addibot (ADDItive roBOT).

An important characteristic of additive manufacturing apparatus may be that material is added to a product in a controlled manner that is driven by a digital model that resides in a controller. Through the processing of the additive manufacturing apparatus the digital representation may be translated to a physical approximation of material placed in three dimensional space.

Accordingly, in some examples disclosed in this disclosure, a mobile additive manufacturing apparatus which may be called an Addibot may be configured to include a drive system which may be operative to move the apparatus along a surface. In some examples the Addibot may function with no physical tether. In addition, the Addibot may include a navigation system which among other functions may determine the Addibots' current location and its current bearing or direction that it would travel in when caused to move or is travelling in if moving.

The Addibot may additionally include a controller capable of executing code which may perform an algorithmic function. The controller may also provide controlling signals to other elements of the Addibot. The Addibot may additionally include an additive manufacturing system to deposit a material or combination of materials in prescribed locations across the surface that the Addibot is on or will move to during its processing. The additive manufacturing system may add material to a surface based on a digital model that may be processed in one or more controllers that may be located in the Addibot. The origin of the digital model may be determined externally to the Addibot or alternatively may be determined by sensing or other processing of the Addibot or may be a combination of external model definition combined with the data related to sensing apparatus within the Addibot. The systems that the Addibot has may be powered by a power system capable of providing power to operate at least the drive system, the navigation system, the control system, and the additive manufacturing system of the Addibot. In some examples multiple power systems may be present in an Addibot.

The additive manufacturing system of an Addibot may include many different types and definitions capable of adding material based on a digital model in controlled fashion. In some examples, the additive manufacturing system may include a three dimensional ("3D") printing head. The printing head may add material to a surface in many standard manners including extrusion of a material by the printing head or ejection of material in liquid or solvated form.

In some examples, the 3d printing head may include an array of nozzles which individually eject liquid form droplets in response to an electronic control signal provided to the nozzle. In some examples, the liquid that may be process by the 3d printing head may include one or more of water, a water or aqueous solution, a hydrocarbon based solvent, an inorganic solvent, or an emulsion of a combination of two or more of water, hydrocarbon, or inorganic based solvents. Solutions may include a material solvated in one or more of the water, hydrocarbon, or inorganic based solvents.

In another aspect, a dimension of time may be included wherein one or both of: a) a specified rate of extrusion and b) a specified order of extrusion is controlled in order to obtain a desired result. Embodiments may accordingly include a ratio of time over distance and rate of extrusion.

In some examples, the Addibot may also include a vision system. The vision system may be operant to create a digital model of the topography of a surface in a region proximate to the mobile additive manufacturing apparatus. The vision system may operate on or within the Addibot and use a variety of detection schemes for analyzing the surface and creating the model of the surface including light or laser based imaging techniques or other electromagnetic radiation based imaging including infrared, ultraviolet or other electromagnetic radiation sources. In some examples, the vision system may utilize sound based radiations to create a digital model of its surroundings which may include the surface in the region of the Addibot. In other examples, the Addibot may deploy a physical sensor to determine the topography of the surface in a region studied by the vision system. A controller located within the Addibot may initiate the operation of the vision system and may receive signals in response to the metrology that the vision system performs. In other examples, the Addibot may communicate with a vision system that is located external to itself or on another Addibot for example.

In some examples, the Addibot may also include a material storage system capable of storing at least a first material to be supplied to the additive manufacturing system. The stored material may include solids, powders, gels, liquids, or gasses to mentions some non-limiting examples. In some examples, the material may be in wire forms or in some example may exist as physical solid entities which are placed by the additive manufacturing system. The material storage system may maintain a storage condition for the material by controlling an environmental condition. The condition that may be controlled may include one or more of temperature or pressure of the material.

In some examples, the Addibot may also include a surface preparation system. The surface preparation system may be capable of removing one or more of flaked surface material, dust, dirt, and debris from the surface region in a region in advance of the additive manufacturing apparatus. Since the Addibot may move or when stationary the additive manufacturing system within the Addibot may move in a direction, the surface preparation system may be operant to process a region of the surface where the additive manufacturing system on its own or under the drive system of the Addibot may move to.

In some examples, the Addibot may also include a communication system that may be capable of transmitting signals outside the mobile additive manufacturing apparatus. In some examples users may use communications systems external to the Addibot in transmitting a control signal or control signals to the Addibot. The communication system may also be capable of receiving signals originating outside of the mobile additive manufacturing apparatus. In some examples, the signals transmitted or received may include one or more of radiofrequency signals, infrared signals, optical signals or sound based signals or emissions as non-limiting examples. In some examples the communication system may function to sense the environment of the mobile additive manufacturing apparatus. The sensing may occur in addition to signal transmission function. In some examples, there may be multiple communication and/or sensing systems within an Addibot.

In some examples, the power system of an Addibot may include a battery.

In some examples, the power system of an Addibot may include a combustion engine or other type of engine.

In some examples the power system of an Addibot may include an electrical wire that may be connected to an electrical power source that may reside external to the Addibot which may also be called a mobile additive manufacturing apparatus.

There may be numerous methods related to a mobile additive manufacturing apparatus. In some examples a user may transmit a signal to an Addibot which may include any of the types of examples of apparatus that have been described. The transmitted signal may cause the Addibot to next deposit a first layer of material on a surface utilizing systems of the Addibot. The Addibot may, in continued response to the initial signal, move from a first location to a second or different location. After moving, the Addibot may in further continued response to the initial signal deposit a second layer of material. The makeup of the first layer and second layer of material may be different in composition or physical aspects such as thickness or may be identical except in the aspect that it is located in a second location.

In some examples, the methods may additionally include a step to orient the apparatus for mobile additive manufacturing, which may be called an Addibot, in a spatial coordinate system.

In some examples, the methods may additionally include a step to perform a metrology process to measure the topography of a region of a surface. This may typically be in a region proximate to the Addibot or in a region that the Addibot will move to. In some examples additional steps in the method may include processing the result of the metrology process and using the result of the processing to control the additive manufacturing system of the Addibot.

In some examples the methods relating to processing by an Addibot may include the step of depositing a layer of material shaped by molding patterns. The molding patterns may be used to force molten material in some examples, or polymer precursors in some examples, into predefined shapes such as shapes consistent with building features including walls, blocks and the like. The placement of the molding patterns may be coordinated by an Addibot device which may be controlled by a controller implementing pattern directions communicated to the controller in digital form.

In some examples a mobile additive manufacturing apparatus may include a first mobility frame. The first mobility frame may include: a controller capable of executing algorithms and providing control signals; and an additive manufacturing system to deposit at least a first material in prescribed locations across a surface according to a first digital model processed by the controller. The mobile additive manufacturing apparatus may also include a drive system operative to transport the additive manufacturing system along the surface; wherein the drive system is located in a second mobility frame connected to the first mobility frame; a vision system; wherein the vision system views the roadway surface and coverts capture image data into a model of surface topography; a navigation system to determine a location of the additive manufacturing system and guide the drive system; and a power system capable of providing power to operate at least the drive system, navigation system, control system and additive manufacturing system. The first material that is deposited may be added to the additive manufacturing system as a discrete composite material comprising multiple layers.

In some examples, the method may also include steps where one of the multiple layers of the discrete composite material comprises stone pieces coated in asphalt or polymer modified asphalt.

In some examples, a discrete material element of an Addibot may include an inner core which may include aggregate; a coating layer comprising an adhesive; and an external coating layer. In some of these examples the discrete material element may be released from an additive manufacturing robot.

In some examples an additive material array device may be formed which may include an array of deposition elements; a storage element that feeds the array of deposition elements; a thermal control element that maintains a temperature of or within the storage element; and a local heating system that provides energy to a discrete material element, wherein the discrete material element is released by the deposition element. In some of these examples, the local heating system may provide energy as the discrete material element falls through it. In some examples, the additive material array device may have a local heating system which includes a microwave emitter. The microwave emitter may heat material between its electrodes by providing microwave energy that they may absorb.

In some examples, a method for forming and repairing a roadway may include transmitting a control signal to an apparatus, wherein the apparatus is a mobile additive manufacturing apparatus. The mobile additive manufacturing apparatus may include a drive system operative to move the apparatus along a surface; a navigation system to determine location; a controller capable of executing algorithms and providing control signals; an additive manufacturing system to deposit at least a first material in prescribed locations across the surface according to a digital model processed by the controller, and a power system capable of providing power to operate at least the drive system, navigation system, controller, and additive manufacturing system. The method may additionally include forming a first deposit of a first material on the surface, wherein the first material is deposited by dropping a discrete material element from an additive material array device of the additive manufacturing system. The method may include moving the apparatus to a different location and forming a second deposit of a second material on the different location.

In some examples a method of using an additive manufacturing robot may include depositing from an additive manufacturing element of the additive manufacturing robot a conductive material upon a roadway bed, wherein the deposit is controlled to be located in a pattern that will emit energy towards a vehicle passing over the conductive material. The conductive material may be extruded from an extrusion element fed by a filament form of a composite material, wherein the filament form comprises a metal mesh or wire surrounded by a thermoplastic coating layer.

The resulting structures may create an infrastructure for advanced roadways through which electrical signals may be communicated. Some examples may include power and charging electrical devices, transmitters of various kinds in roadway, and transmitters of various kinds alongside of roadway. Some transmitters may communicate via wired means and others may communicate at least in part by wireless means. Within a constructed roadway as described in this disclosure there may be devices to control or generate signaling information for location, signaling information relating to the status of the roadway or sensors within the roadway. In some examples, roadway systems may be configured to transmit data along the path of the roadway. In some examples the transmission along the roadway may comprise completely wireless communication in other examples a combination of wireless and wired, sometimes with portions of the path beneath the roadbed may occur. There may also be communication from systems to equipment in the vicinity of the roadway and to neighboring commercial and residential structures.

One general aspect includes a method of repairing a roadway or a parking lot. The method may also include placing at least three alignment features upon the roadway or the parking lot, where the alignment feature are visibly distinct from the roadway or the parking lot; surveying the roadway or the parking lot, where the surveying may include scanning a surface of the roadway or the parking lot for defects and for the alignment features and recording location information along with scan data; processing a datafile resulting from the surveying to determine a first model of locations to repair, where the first model of locations to repair is calibrated to the location information of the at least three alignment features; moving an mobile additive manufacturing robot upon of the roadway or the parking lot, where a movement is based upon the first model of locations to repair; preparing the surface of the roadway or the parking lot for a repair process with the mobile additive manufacturing robot; and repairing the defects in the surface of the roadway or the parking lot with the mobile additive manufacturing robot. Other embodiments of this aspect include corresponding computer systems, apparatus, and computer programs recorded on one or more computer storage devices, each configured to perform the actions of the methods.

Implementations may include one or more of the following features. The method where the surveying is performed at least in part utilizing an aerial drone. The surveying is performed at least in part by one or more mobile additive robots each equipped with a vision system to scan the surface as the mobile additive robots move over it.

At least a first mobile additive robot may include an ai processing chip to process data received from the vision system. The survey datafile is communicated to a remote server for processing to form the first model of locations to repair. The remote server processes the survey datafile utilizing artificial intelligence algorithms. The method where in the remote server may include at least a first ai processing chip to process the survey datafile. The repairing of the defects may include depositing a sealing material into a crack feature. The repairing of the defects may include depositing a seal coating material upon the surface.

The repairing of the defects may include depositing a plurality of discrete material elements upon the surface. The discrete material elements may include: an inner core; a first coating layer may include an adhesive, where the first coating layer surrounds the inner core; and a second solid coating layer surrounding the first coating layer, where the second solid coating layer prevents the plurality of discrete material elements from binding to surrounding material while the plurality of discrete material elements is in a material storage hopper.

The method may include surveying the roadway or the parking lot to analyze a movement of traffic. The second model may include a location of line features upon the surface of the roadway or the parking lot. An artificial intelligence algorithm is utilized in the creation of the second model. The location of line features is derived by optimizing a flow of traffic. The line features are applied to the surface by spray painting. The line features are applied to the surface by heating a thermoplastic substrate of a line feature. The line features may include an electrically conductive material.

The optimized flow of traffic may be used to generate a third model, where the third model defines locations to add strengthening material to the surface of the roadway or the parking lot. The method may include adding the strengthening material to the surface of the roadway or the parking and covering the deposited strengthening material with an asphalt layer. Implementations of the described techniques may include hardware, a method or process, or computer software on a computer-accessible medium.

BRIEF DESCRIPTION OF THE DRAWINGS

The accompanying drawings, that are incorporated in and constitute a part of this specification, illustrate several examples of the invention and, together with the description, serve to explain the principles of the invention:

FIG. 3A illustrates exemplary methods related to repair of exemplary pothole type road defects.

FIG. 3B illustrates exemplary methods related to repair of exemplary crack type road defects.

FIGS. 4A and 4B illustrates exemplary processor devices that may be useful in supporting the implementation of methods related to Addibots.

FIG. 18A illustrates a multifunctional Addibot comprising an additive manufacturing element and other functions.

FIG. 18B illustrates a camera equipped drone which may be used in concert with Addibots.

FIG. 18C illustrates an aerial survey that may be used in treating a region of the survey.

DETAILED DESCRIPTION OF PREFERRED EXAMPLES

The present disclosure relates to methods and apparatus for mobile automated additive manufacturing. As used herein, "mobile automated additive manufacturing" may include control of locomotion of an additive manufacturing apparatus over a surface free of tracks or rails.

Figure 1:
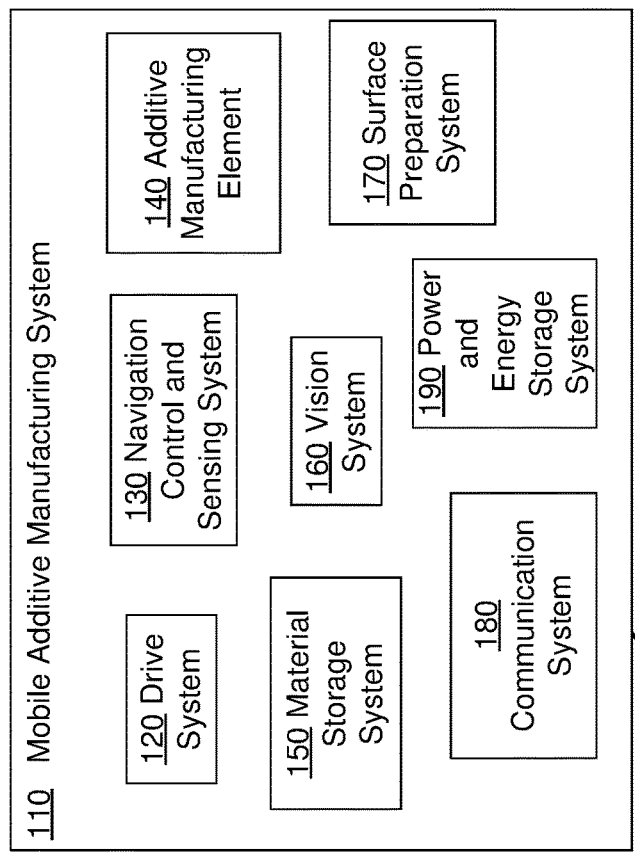
FIG. 1 illustrates a block diagram of the general components of a mobile automated additive manufacturing apparatus.

Referring to FIG. 1, 100, some elements of an exemplary mobile additive manufacturing system (110) may be found. The system may have a movement system 120 enabling transportation of the manufacturing system over a surface. This movement system may also be referred to as a drive system. The movement system 120 may function to move the apparatus on both flat and shaped or curved topography. The movement system 120 may function on wheels, balls, tracks or other means of conveyance known in the art. In some examples, the use of automotive or truck frames either with trailers or with modification directly to the frame itself may be used. The movement system 120 may incorporate a drive mechanism comprising an engine or motor that may act upon the conveyance elements such as wheels or may utilize transmissions and axles to drive the conveyance elements. Various forms of directional or steering control may be possible. In some examples, the differential control of multiple motors acting upon conveyance elements may allow for directional control. In other examples, the directional control may function by a steering system that moves the conveyance elements in ways other than in its drive sense.

The mobile additive manufacturing system 110 may include a Navigation, Control and Sensing system 130 that may function to determine a current location to a desired degree of accuracy as well as an orientation of the device at that location. Such information may be useful in regulating direction control through the navigation system and in determining other control variables such as speed. The sensing system may provide other environmental information to the control system such as temperature and humidity at the location and in some examples at a surface beneath the location of the system. In addition, the sensor and navigation elements may also function to provide awareness of obstacles in the environment of the mobile additive manufacturing apparatus. A separate vision, measurement and inspection system may be present in some examples (a following discussion discusses this in detail) and may interface with the control elements or sensing elements. The control elements may receive data in various forms and may process the data utilizing computational hardware and programing algorithms. The processing may produce control signals to engage the mobile additive manufacturing apparatus to produce an environmental change such as adding material of various forms to create three dimensional surface characteristics such as a flat surface, a surface of defined topography or a surface where defects of various types are affected with the addition of material. In other examples, the addition of material may be used to create an image or another functional aspect such as a slip resistive coating or a tread cleaning function as examples.

The navigation element may utilize various protocols to generate location awareness. For example, the element may utilize GPS technology. In other examples, a local transceiver network may provide telemetry local relative location awareness through the use of RF systems, or light based systems such as a laser based system This local system may function within an outdoor region or alternatively be set up to function within a building. Cell phone based telemetry, and other schemes such as seismic location detection may provide information for telemetry. In some examples, the navigation element may provide a first order telemetry to an accuracy required to control movement of the apparatus, for example. The vision system (to be discussed) or other sensing elements may provide a next higher accuracy for calibration of location. Location marks may be present upon or within the surface and a sensor such as a camera system, for example, may pick up the location marks to calibrate the navigation system and the control system. Various other reference elements such as physically defined lines, such as found on roads or parking lots may be a type of navigation control system. Still further examples may involve the embedding of conductive wires to create a navigation information system. A grid of such conductive wires may create a calibrated work floor with a good deal of accuracy. In still further examples, the surface to be acted on by the mobile additive manufacturing apparatus may be a temporary surface that may itself be moved. Sheets of a temporary material may function as the surface and these sheets as well may include coloration and/or physical elements such as embedded conductors to provide a telemetry signal for the navigation element.

The Navigation control and sensing system 130 may function to define a path that the mobile additive manufacturing apparatus follows in its process. In other examples, the path itself may be figured into the design of a desired topography. For example, in some examples it may be necessary for the mobile additive manufacturing apparatus (Addibot) to travel along a road surface and perform additive manufacturing based on aspects that it measures or determines of the surface as it travels. In other examples, the shape of a feature to be deposited across a surface may involve the control of the navigation system to move the Addibot to a location where the additive manufacturing element can further control the additive process. In these cases, the path of the Addibot could be arbitrarily complex based on a model that it follows to generate an end result.

Referring now again to FIG. 1, an additive manufacturing element 140 may be represented. The various techniques known in the art may be included as an additive manufacturing element including, for example, extrusion heads, stereolithography processing heads and material printing heads. An altered version of stereolithography may occur by the application of thin films of liquid material upon the surface which is then subsequently processed to create hardened surfaces. If the unreacted material is removed a subsequent application of liquid reactant can begin to build the next layer.

The material printing heads may have a wide diversity in characteristics. Printing heads with very fine resolution may be utilized. In other examples larger volumes of material may be printed with heads that have gross resolution. As an example, a printing head may have rows of print heads that have an orifice size such that a roughly millimeter sized droplet may be formed. Such a droplet may have a volume of roughly 10-100,000 times that of a droplet from a 1:1000 resolution. The volume of a millimeter diameter droplet may have an estimated volume of about 0.4 microliters.

In some examples, the additive process can relate to an element such as a print head depositing droplets of material over the surface to build structure. In stereolithography, an energy source is used to convert the liquid to a solidified material, but in these other examples, the droplets of material may either react with the surface or solidify by other principals such as by cooling for example. Combinations of droplets of different material may also result in reactions that result in solidified material.

The additive manufacturing element may also function to add material that changes color or pattern or other physical properties in select regions. A version of this type of additive manufacturing may occur when powders are deposited in the additive process. The powder may create lines or other demarcations. In some of these examples, a subsequent sealing of the powder form may be deposited by another additive manufacturing process.

In some examples, the additive manufacturing element may be an energy source such as a laser, ion beam or the like. As non-limiting examples, the energy source may be used to cause solid sheets of material to bond together or may be used to cause liquid material to solidify in defined regions. The liquid material may be added by the Addibot or be present by other means. As an example, an Addibot may ride upon a transparent surface that may sit above a liquid reservoir of relatively arbitrary size. An Addibot with a laser may ride upon the transparent surface and irradiate the surface layer of the reservoir in desired locations. After a layer is processed, the work material beneath the transparent surface may be moved away from the transparent surface by a layer thickness and the Addibot may again move around on the transparent surface irradiating through the surface to image polymerizable material beneath.

The various additive manufacturing elements that may be used in these manners include the art that is consistent with mobile automated additive manufacturing.

An additive manufacturing element 140 may be part of the mobile additive manufacturing system. There may be numerous types of additive manufacturing elements consistent with this type of system. For example, in some examples, the material to be added may be found in a liquid form either in its nascent form or in a processed form. The liquid material may be processed by droplet ejection printing schemes. Some printing elements may include MEMS jet printing elements. In other examples, the printing element may include an array of valves that open and close to dispense controlled amounts of the liquid. In still further examples, a liquid stream may be controlled by the presence of mechanical shunts which do not allow a stream of the liquid to be released below the element. In fact, any liquid control mechanism, typically deployed in an array of elements, which may allow for a spatial control over the dispensing of the material, may include an additive manufacturing element for liquids in a mobile additive manufacturing system.

In FIG. 1, a material storage system 150 may be found. As has been described there may be numerous types and forms of material that may be processed by an Addibot. In some examples, materials in filament form may be used; in other examples liquids of various kinds may be employed. And, in still further examples, solids such as powder form materials may be utilized. In each of these cases, there may be numerous material options within a particular kind. There may be standard ABS plastic filaments or other plastic filaments. In some examples, other fibers such as fiber class filaments may be utilized in composite processing such as with epoxy resin combinations with fiberglass filaments. In the liquid form a great diversity of materials may be used including resins, photoactive and thermoactive materials. Other materials in the liquid form may be a solid at an ambient condition but may be processed by the additive manufacturing system at conditions that make the material liquid. The powder form examples may be thermo-active and photoactive materials or alternatively may be materials that in combination with other deposited materials cause a reaction to occur resulting in a deposited solid material. In the state of the art, metals, insulators, and ceramics to name a few materials may be formed by the processing of powder form materials. In other examples, the powder deposited will remain in a powder form on the surface.

In the various materials examples that may be possible with an Addibot, the environmental storage conditions on the Addibot may be important. Accordingly, the material storage system 150 may have controls over numerous environmental conditions such as the temperature of the material storage, the pressure, the ambient gasses or a vacuum condition and the humidity to mention some examples. Thus, the material storage system for an Addibot would have control systems for the important environmental conditions. The storage system would need to allow for the automated or non-automated replenishment or replacement of the material that is located in an Addibot. In some examples various combinations of multiple material storage systems may be present. For example, a powder storage system and an additive manufacturing element for powder forms may be combined with a liquid storage system and an additive manufacturing element for liquid forms upon the same Addibot system. In still further alternative, two different forms of material may be combined with different storage systems that feed a single additive manufacturing element that is designed to simultaneously process the two material types.

Other examples may have additive manufacturing elements to disperse solids. The element may extrude elements of material that may be gelled to allow for the material to be formed by the additive manufacturing head. The extrusion elements may also deposit small pieces of extruded material that is in a gelled or partially melted form. Lasers or other high energy sources may cut the small pieces from the extrusion print head as it is being extruded. In other examples, the material is not cut as it is formed into three dimensional shapes.

Solids may also be dispersed in powder forms. The powder may be carried in a solvent as an emulsion that may be dispersed in manners that liquids may be dispersed. In other examples, the powders may be controlled by valves or shunts as it is dropped or impelled onto the surface.

The various materials that are added to the surface may be further treated to form a solidified surface. In some cases, materials may be treated with light or other energy to heat or otherwise react the materials to form a solidified result. In other cases, a chemical reaction may be caused to occur by the addition of a second material. In such cases the additive manufacturing element may include control elements to disperse liquids and solids or multiple liquids. In addition, the system may include the elements to post process the material such as by thermal or photochemical action. These post processing elements may be located on the additive manufacturing element or may be located in other portions of the system. In some examples, the post processing may also include processes to wash or clear the surface from materials that are not solidified, adhered, or attached to the surface. These processes may include processing to remove solid, powder or liquid material remaining on the work surface such as vacuuming or sweeping. The removed material may be recycled into the material storage system or may be moved to a waste receptacle. In similar fashion the post processing steps to remove material may be performed by elements that are included on the additive manufacturing element or additionally be other elements that are included in the mobile additive manufacturing system.

The results of the various additive processes may be measured by various manners to verify the conformity of the result to a modeled surface topography. An inspection system or a vision system 160 may perform these measurements to control the results. In some examples, the surface may also be studied with a similar or identical metrology element to determine the presence of topography. Another way of looking at such a measurement before the additive manufacturing step may be to examine the surface for defects, cracks or fissures that may need to be processed to form a flat surface for example. Therefore, the vision system 160 may in fact occur multiple times in the system. A pre-measurement may be performed by a first measurement element and a post processing measurement may be performed by a second measurement element. There may be numerous manners to measure the surface topography. As an example, a light or laser based metrology system may scan the surface and analyze the angle of reflected or scattered light to determine topography. Similar scanning systems based on other incident energy like sound or electromagnetic signals outside the visible spectrum like infrared or UV radiation, for example, may be used.

A different type of metrology system may result from profilometry where an array of sensing elements may be pulled across the surface and be deflected by moving over changes in topography of the surface. An array of deflecting needles or stylus may be dragged over the surface. In an alternative example, a pressure sensitive surface may be pulled over the surface under study.

The surface that the mobile automated additive manufacturing system acts on may have movable defects that exist on it. This may be commonly classified as dust or dirt for example. An element for preparation of the surface 170 may be located in an Addibot. In some cases, the material may be removed by a sweeping or vacuuming process that moves the particles into a region that removes them from the surface. Other methods of removal, which may replace or supplement the sweeping or vacuuming, may include pressurized gas processing which may "blow" the surfaces clean. There may also be electrostatic processes which charge the particles with electric charges and subsequently attract them to charged plates which attract the particles away. A cleansing process may also include a solvent based cleaning process which may subsequently be removed in manners mentioned earlier, in a combination of the Addibot techniques. A first Addibot may function to pretreat a surface in a variety of manners while a second Addibot performs a topography altering additive manufacturing process.

Another element, a communication system 180, of the mobile additive manufacturing system may be found referring to FIG. 1. In general, Addibots may be used in combinations to perform functions. To effectively perform their function, it may be important that the Addibots may be able to communicate with each other. The communication system may also be useful for communication between the Addibot and a fixed communication system. The fixed communication system may be useful for communicating various data to the Addibot as well as receiving data transmissions from the Addibot. The data transferred to the Addibot may include programming software or environmental target files or the data may include environmental data such as mapping data or topological data as examples. The communication may be carried by RF transmission protocols of various kinds including cellular protocols, Bluetooth protocols and other RF communication protocols. The communication may also utilize other means of data transfer including transmissions of other electromagnetic frequencies such as infrared and optical transmissions. Sound waves may be useful for both communication and spatial mapping of the environment of the Addibot. In some examples the Addibot may be tethered to at least a communication wire that may be useful for data transmission.

Another form of communication may relate to visual based information conveyed by the Addibot body itself. In some examples, the Addibot body may include a display screen to communicate information to the surroundings in the form of graphic or visual data. As an example, the display can warn people in the environment of the Addibot as to the function that the Addibot is performing and when and to where it may move. Audio signaling may include part of the communication system in addition. As well, the Addibot may be configured with a light system that can project visual signals such as laser patterns, for example.

The communication system may be useful to allow external operators to provide direction to the Addibot. The directions may include the control of navigation in both a real time and a projective sense. Users may utilize the communication system to provide activation and deactivation signals. Numerous other functional control aspects may be communicated to control operation of the Addibot other than just the transfer of software programs including for example activation and control of the various subsystems.

A Power and Energy storage element 190 may be found within the mobile additive manufacturing system. In some examples, an Addibot will be tethered with a wire. The wire may be used for a number of purposes including providing power to the Addibot drive system or to an energy storage system within the Addibot. In many examples, the Addibot will operate in a wireless configuration, and therefore, will contain its own power system in the mobile platform. Standard combustion engines and hydrocarbon fuels may include a power system along with a generator driven by the engine to charge batteries as an electric charging system. In other examples, a battery powered system may power both the drive system with electric motors as well as the electronics and other systems. The battery storage system may be recharged during periods of non-use and the components of such a recharging system may include portions of the power and energy storage element. In some examples where the Addibot operates in an automated fashion, the recharging of the energy storage element may also occur in an autonomous fashion whether it is recharging electrically or obtaining additional fuel stores.

Exemplary Structure of an Addibot

There may be numerous manners to configure the novel mobile additive manufacturing system that has been described. In the following examples, non-limiting examples are provided as examples of the different manners that the Addibot apparatus type may be utilized. In particular, in the next example related to FIG. 2A, 200 reference and description will be made to an Addibot that is configured for resurfacing. The additive manufacturing functions of such an Addibot may provide a good example for the various systems and components in some Addibots. The example is provided to give a perspective in this disclosure of supportive systems that may be present for other types of exemplary Addibots such as for wall building and roadway construction and repair as non-limiting examples.

Figure 2A:
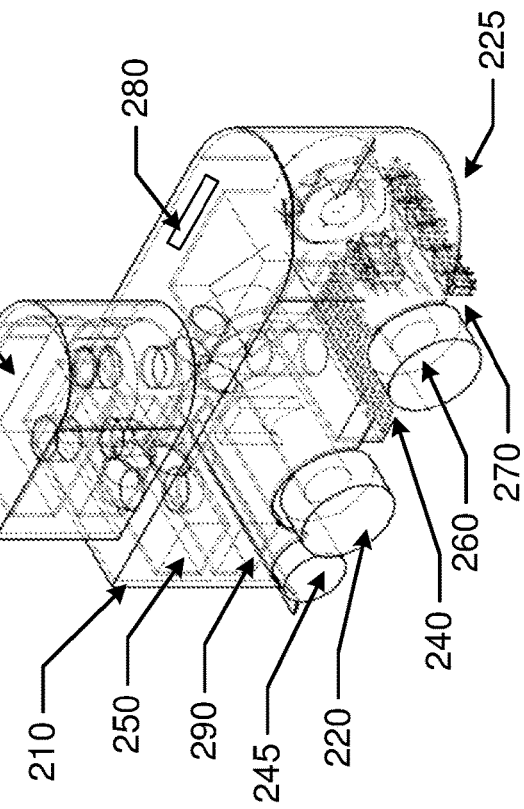
FIG. 2A illustrates a perspective view of an exemplary Addibot that may be useful for Additive Manufacturing Surface Treatment.

Referring to FIG. 2A, 200 an example of an Addibot may be found. The chassis 210 of the Addibot may contain and support the systems of the Addibot in a mobile and autonomous manner.

The drive system 220 and drive flexible wheel 225 of this example may be exhibited. The depiction provides an example of one possible drive system using three wheels. An example using four or a different number of wheels may also be within the scope of the inventive art herein. The drive system may be constructed, though, in a manner in which it does not interact with the other Addibot systems, for example, the vision system or the additive manufacturing element system. Depending on how the wheels of the drive system 200 are powered, they may also be part of the navigation, control and sensing system. Based on the input from the vision system (as a part of the navigation control and sensing system) the wheels may direct the Addibot to its desired path, in a fashion that is either autonomous or predetermined, depending on the orientation and number of the wheels.

A sensing element 230 may be depicted. This element may be used to perform functions necessary in the navigation, control and sensing system for this example. The navigation functions could be performed through GPS, an element grid, or other manners as has been described relating Navigation, Control and Sensing system 130 of FIG. 1.

An additive manufacturing element 240, and a secondary additive manufacturing element 245 for this example may be shown. The additive manufacturing element 240, for this example, may be a material printing head, as described in reference to the additive manufacturing element of FIG. 1, which may dispense water droplets of a controlled size, as well as a controlled temperature (which may be controlled by the material storage systems). This element may function to execute a precise additive process of the material, based on input from the vision system. Another element, in this example, the secondary additive manufacturing element 245 may be a roller or other type of distribution apparatus that spreads or smoothens to a degree, material that was added to the surface.

Elements of a material storage system 250 of this example are shown. These components may include various elements that may be necessary for material storage within an Addibot. There may be numerous alternative designs and orientations of components that may be consistent with the function of an Addibot. For this example, it may be important to include a surface material collection element which may be in part be filled from material outputted by the surface preparation system. These devices may be necessary for removing particles that may contaminate or otherwise interfere with the correct operation of the Addibot.

A vision system 260 for this example may be depicted as shown. This element may use a variety of methods such as those described in reference to vision system 160 of FIG. 1. These may include a laser scanner, sensitive extruding pins or brushes, or such components as may allow for inspection of the surface to be process or for determination of the topography of the surface. Alternative orientations may be possible including for example an orientation where a vision system may be placed behind the additive manufacturing element to perform a post-inspection of the surface, after the material has been applied. Among other purposes, the inspection may be used to verify the results of the addition process and to see if more or less material may need to be added.

A surface preparation system 270 for this example may be observed. In this example, it may be necessary to remove particles, snow, dust, debris, or dirt from the surface before it may impede the accuracy of the vision system in processing the surface topography. The surface preparation system 270 shown in FIG. 2A may include a brushing system, a vacuum system, and a scraping system or a combination of these. These systems may be used to remove undesired particles from the surface. Other particle removal systems, including ionizing plates, a sweeping broom, or other brush based devices, other types of vacuums or suction devices; high pressure gas treatments to blow surface debris into a collection region, among other systems may also be usable for this example of an Addibot.

A communication system element 280 for this example may be seen. This element may be used to carry out communication processes, either between other Addibots or an external user. These tasks may be carried out in manners consistent with methods described in reference to the communication system 180 of FIG. 1.

A power and energy storage system 290 may be depicted. This element may be a battery to power the example's electrical systems and motors, or a combustion engine to power the drive system which may also charge a battery system as non-limiting examples. The power system may provide mechanical energy to the drive system or may provide electrical energy to the drive system which may power engines that comprise portions of the drive system. Electrical energy from generators connected to combustion engines or from battery sources may be used to power substantially all of the electronic systems utilized throughout an Addibot. Other energy storage sources such as compressed air may also be acceptable solutions for energizing the operations of an Addibot.

Roadway Repair with Addibots

An Addibot, may be guided to a defect through communication of location information. In other examples, an Addibot may analyze a road surface to detect the presence of cracks or potholes in a non-limiting example. Teams of Addibots may survey roads and repair the defects that are found. Examples have been provided for the repair of potholes in conjunction with advanced roadways, it may be apparent that Addibots may be used in similar manners for repair of such features on generic roadways of various types.

The exemplary Addibot as has be described earlier in the present disclosure may be used to perform a process of repair, and referring to FIG. 3A, a repair on a pothole 300 may be illustrated. An exemplary step for drying the pothole 305 defect may start with a vacuum process or the addition of a drying agent followed by its removal. Next filling material may be added to the pothole. In an example, a composite material 315 of filler and adhesive/sealing material may be added in addition step 310.

In another example of an addition step 320, a layer of filler material 325 such as stone may be added as an example. An addition step 330 may add a layer of adhesive and sealing material 335 upon the layer deposited in the addition step 320. In some examples, the addition step 320 and addition step 330 may be performed and then repeated in sequence numerous times until the pothole 300 is filled to an appropriate level. In some examples, the appropriate fill level may be to the top of the pothole 300 to be level with the surrounding roadway. In other examples the appropriate fill level may be above the level of the surrounding roadway.

In some examples, the filed pothole 300 may be further processed by processing after filling 340. The processing after filling may include rolling or other high pressure treatments to consolidate the filled material. As an additional, non-limiting example, the processing after filling may also include high frequency vibration treatments to consolidate the filled material. In other examples, treatments with polymerizing treatments such as exposure to Ultra-Violet light (UV) may be performed to initiate polymerization reactions with appropriate polymerizable material if it was included in the adding of a layer of adhesive or sealing material steps. In some examples, a cooling treatment 345 may be performed if the filler material and adhesive and sealing material are added hot or generate heat in their polymerization processing. The cooling treatment 345 may be performed to cool at least a surface layer of the filled material so that traffic may be allowed to run on the repaired roadway.

The exemplary Addibot as has be described earlier in the present disclosure may be used to perform a process of repair, and referring to FIG. 3B, a repair of cracks 350 may be illustrated. An exemplary step for cleaning the cracks 355 may start with a cleaning with pressurized air as a non-limiting example. As an additional non-limiting example, this step for cleaning the cracks 355 may also include a destructive step, such as routing, to widen the crack, if the crack has a larger sub-structure than the crack's surface profile, or if the overall size of the crack is initially too small to make the necessary repairs. Next filling material may be added to the crack. In an example, a sealing agent 365 may be added in addition step 360. The Addibot may position a component to perform the addition step 360.

In another example of an addition step 370, an array of components may deposit multiple locations of droplets 375 of sealing material. The pattern of the multiple droplets may be controlled by a controller within the Addibot. As the Addibot moves over the roadway it may dispense sealing material at appropriate locations based on crack location. In some examples, the steps at 360 and 370 may be performed and then repeated in sequence numerous times until the crack 350 at a particular location is filled to an appropriate level. In some examples, the appropriate fill level may be to the top of the crack 350 to be level with the surrounding roadway. In other examples the appropriate file level may be above the level of the surrounding roadway.

In some examples, the filed crack 350 may be further processed by processing after filling 380. The processing after filling may include rolling or other high pressure treatments to consolidate the filled material. In other examples, treatments with polymerizing treatments such as exposure to Ultra-Violet light (UV) may be performed to initiate polymerization reactions with appropriate polymerizable material if it was included in the adding of sealing material steps. In some examples, a cooling treatment 385 may be performed if the filler material and adhesive and sealing material are added hot or generate heat in their polymerization processing. The cooling treatment 385 may be performed to cool at least a surface layer of the filled material so that traffic may be allowed to run on the repaired roadway. Examples have been provided for the repair of cracks in conjunction with discussion of advanced roadway, it may be apparent that Addibots may be used in similar manners for repair of such features on generic roadways of various types.

Control Systems

Referring now to FIG. 4A, a controller 400 is illustrated that may be used in some examples of a mobile additive manufacturing apparatus. The controller 400 includes a processor 410, which may include one or more processor components. The processor may be coupled to a communication device 420.

The processor 410 may also be in communication with a storage device 430. The storage device 430 may include a number of appropriate information storage device types, including combinations of magnetic storage devices including hard disk drives, optical storage devices, and/or semiconductor memory devices such as Flash memory devices, Random Access Memory (RAM) devices and Read Only Memory (ROM) devices.

At 430, the storage device 430 may store a program 440 which may be useful for controlling the processor 410. The processor 410 performs instructions of the program 440 which may affect numerous algorithmic processes and thereby operates in accordance with mobile additive manufacturing equipment. The storage device 430 can also store Addibot related data in one or more databases 445 and 446. The databases 445 and 446 may include specific control logic for controlling the deposition of material at each of the additive manufacturing components which may be organized in matrices, arrays, or other collections to form a portion of an additive manufacturing system.

Referring to FIG. 4B additional aspects of control systems are displayed. Referring now to FIG. 4B, additional aspects of controller hardware useful for implementing the present invention may be illustrated as a block diagram that may include a controller 450 upon which an embodiment of the invention may be implemented. Controller 450 may include a bus 452 or other communication mechanism for communicating information, and a processor 454 coupled with bus 452 for processing information.

Controller 450 may also include a main memory 456, such as a random-access memory (RAM) or other dynamic storage device, coupled to bus 452 for storing information and instructions to be executed by processor 454. Main memory 456 may also be used for storing temporary variables or other intermediate information during execution of instructions to be executed by processor 454. Controller 450 may further include a read only memory (ROM) 458 or other static storage device 460.

Controller 450 may be coupled via bus 452 to a display 462, such as a cathode ray tube (CRT) or liquid crystal display (LCD), for displaying information to a computer user. An input device 464, including alphanumeric and other keys, may be coupled to bus 452 for communicating information and command selections to processor 454. Another type of user input device may be a cursor control 466, such as a mouse, a trackball, a touchpad, or cursor direction keys for communicating direction information and command selections to processor 454 and for controlling cursor movement on display 462. This input device may typically have two or three degrees of freedom in two axes, a first axis (e.g., x) and a second axis (e.g., y), that allows the device to specify positions in a plane.

Some embodiments of the invention may be related to the use of controller 450 for setting operational parameters. According to one embodiment of the invention, control parameters may be defined and managed by controller 450 in response to processor 454 executing one or more sequences of one or more instructions contained in main memory 456. Such instructions may be read into main memory 456 from another computer-readable medium, such as storage device 460. Execution of the sequences of instructions contained in main memory 456 causes processor 454 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein may refer to any medium that participates in providing instructions to processor 454 for execution. Such a medium may take many forms, including but not limited to, non-volatile media, volatile media, and transmission media. Non-volatile media includes, for example, solid state devices (SSD) or magnetic disks, such as storage device 460. Volatile media may include dynamic memory, such as main memory 456. Transmission media includes coaxial cables, copper wire, and fiber optics, including the wires that comprise bus 452. Transmission media may also take the form of infrared and radio frequency transmissions, acoustic or light waves, such as those generated during radio wave and infrared data communications.

Common forms of computer-readable media may include, for example, a memory stick, hard disk or any other magnetic medium, a CD-ROM, any other optical medium, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 454 for execution. For example, the instructions may initially be carried on a magnetic disk of a remote computer. The remote computer can load the instructions into its dynamic memory and send the instructions over a distributed network such as the Internet. A communication device may receive the data on the telephone line and use an infrared transmitter to convert the data to an infrared signal. An infrared detector may receive the data carried in the infrared signal and appropriate circuitry can place the data on bus 452. Bus 452 may carry the data, or otherwise be in logical communication to the main memory 456, from which processor 454 retrieves and executes the instructions. The instructions received by main memory 456 may optionally be stored on storage device 460 either before or after execution by processor 454.

Controller 450 may also include a communication interface 469 coupled to bus 452. Communication interface 469 provides a two-way data communication coupling to a network link 470 that may be connected to a local network 472. For example, communication interface 469 may operate according to the internet protocol. As another example, communication interface 469 may be a local area network (LAN) card a data communication connection to a compatible LAN. Wireless links may also be implemented.

Network link 470 may typically provide data communication through one or more networks to other data devices. For example, network link 470 may provide a connection through local network 472 to a host computer 474 or to data equipment operated by an Internet Service Provider (ISP) 476. ISP 476 in turn may provide data communication services through the worldwide packet data communication network now commonly referred to as the "Internet" 479. Local network 472 and Internet 479 may both use electrical, electromagnetic, or optical signals that carry digital data streams. The signals may be transmitted through the various networks and the signals on the network link 470 and through communication interface 469, which carry the digital data to and from controller 450 are exemplary forms of carrier waves transporting the information.

In some embodiments, Controller 450 may send messages and receive data, including program code, through the network(s), network link 470 and communication interface 469. In the Internet example, a server 490 might transmit a requested code for an application program through Internet 479, ISP 476, local network 472 and communication interface 469.

Processor 454 may execute the received code as it is received, and/or stored in storage device 460, or other non-volatile storage for later execution. In this manner, controller 450 may obtain application code in the form of a carrier wave.

Access devices may therefore include any device capable of interacting with controller 450 or other service provider. Some exemplary devices may include a personal digital assistant, a mobile phone, a smart phone, a tablet, a netbook, a notebook computer, a laptop computer, a terminal, a kiosk, or other type of automated apparatus. Additional exemplary devices may include any device with a processor executing programmable commands to accomplish the steps described herein.

A controller may be a programmable board such as an Arduino board, and/or one or more of: personal computers, laptops, pad devices, mobile phone devices and workstations located locally or at remote locations, but in communication with the controller. System apparatus may include digital electronic circuitry included within computer hardware, firmware, software, or in combinations thereof. Additionally, aspects of the invention may be implemented manually.

Apparatus of the invention may be implemented in a computer program product tangibly embodied in a machine-readable storage device for execution by a programmable processor and method actions can be performed by a programmable processor executing a program of instructions to perform functions of the invention by operating on input data and generating output. The present invention may be implemented advantageously in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object oriented programming language, or in assembly or machine language if desired, and in any case, the language can be a compiled or interpreted language. Suitable processors may include, by way of example, both general and special purpose microprocessors.

Generally, a processor may receive instructions and data from a read-only memory and/or a random-access memory. Generally, a computer may include one or more mass storage devices for storing data files; such devices include Solid State Disk (SSD), magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks may be included. Any of the foregoing may be supplemented by, or incorporated in, ASICs (application-specific integrated circuits).

Methods

Figure 5A:
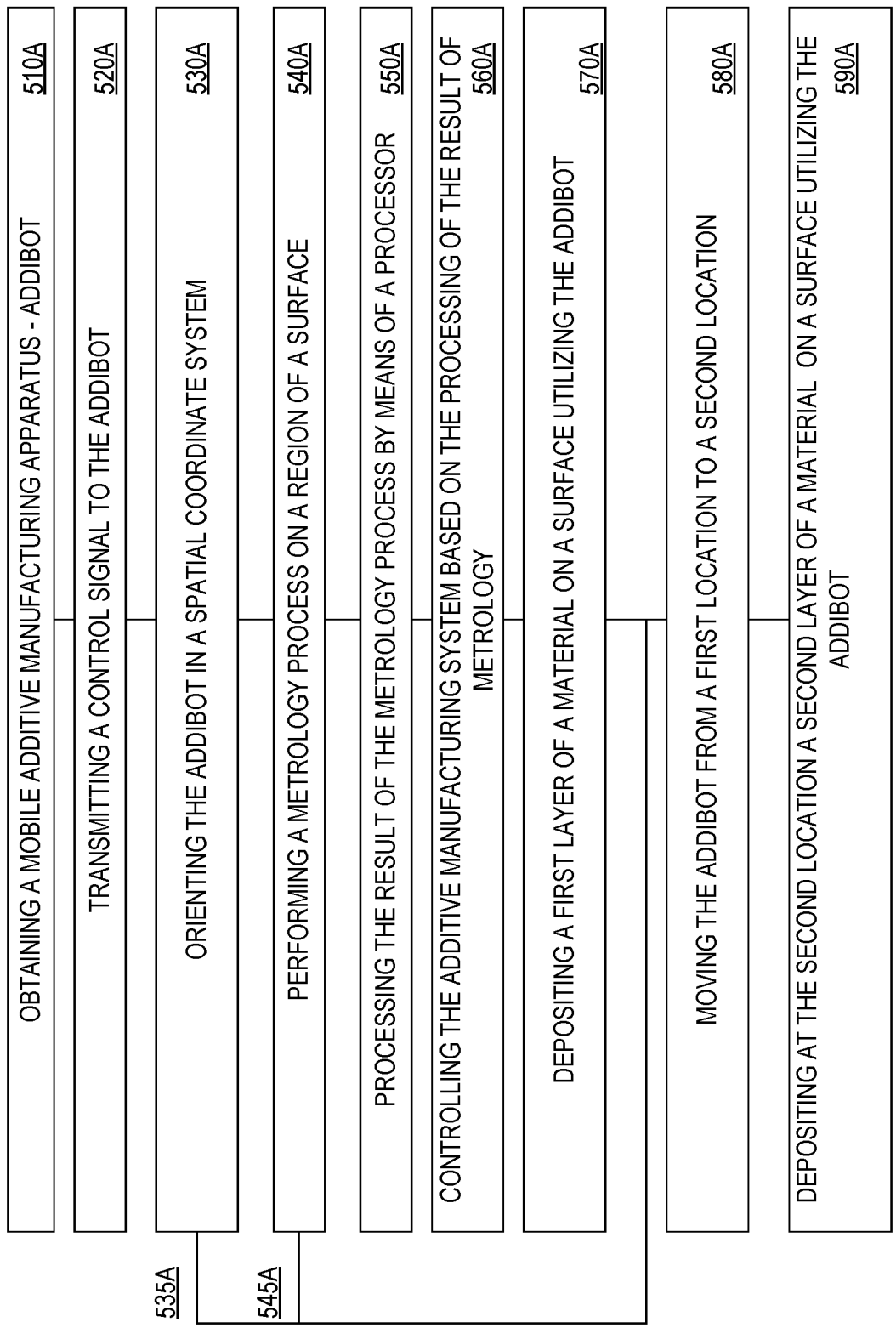
FIGS. 5A and 5B illustrate exemplary methods related to Addibots.
Figure 5B:
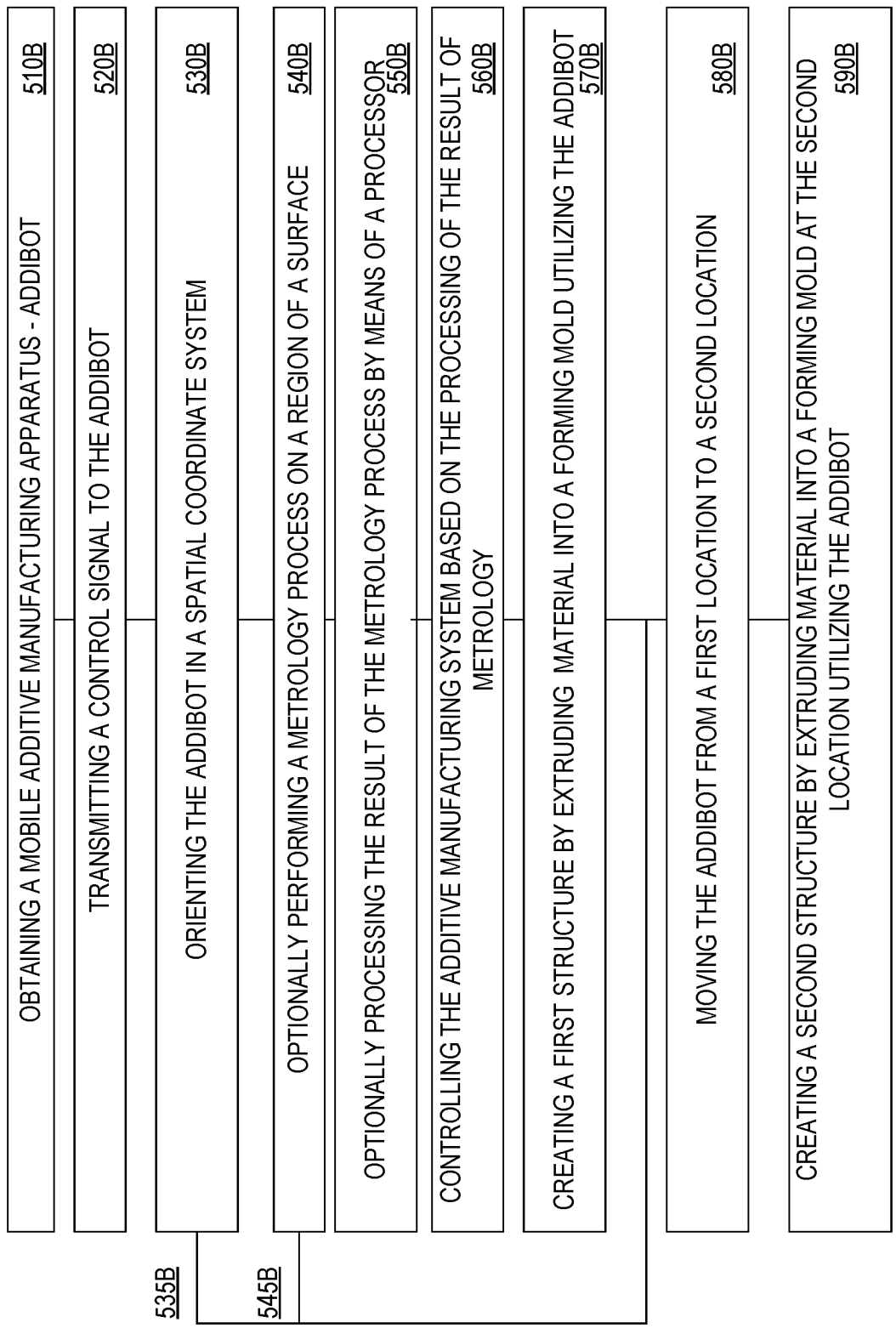

There may be numerous methods of utilizing an Addibot, manufacturing an Addibot or creating a product with an Addibot. Referring to FIG. 5A and FIG. 5B, an exemplary set of method steps that may be commonly utilized in numerous examples of Addibots are displayed. The steps are displayed in a flow chart for example. The steps may flexibly be used or not used, and the order of the steps may be changed within the scope of the inventive art of Addibots.

Referring to FIG. 5A, at 510A, an Addibot of a particular type may be obtained by a user. Next, at step 520A the user may transmit a control signal to the Addibot. The transmitting may involve numerous means including a wireless transmission, a wired transmission or a transmission involving a physical interaction such as pushing a switch or a display panel of an Addibot. The initiation signal may cause a variety of responses that are proximately caused by the initiation even if further interaction with the user is or is not required or if the Addibot will flexibly respond to its environment or programming thereafter.

At 530A, in some examples the Addibot may perform an orientation step. This step may assess one or more of determining a spatial location in a spatial coordinate system and may also assess movement and direction of movement or potential movement in a spatial coordinate system.

At 540A, in some examples the Addibot may perform a metrology process on a region of a surface. In other examples at 540A an apparatus external to an Addibot may perform a metrology process on a region of a surface and may communicate information to an Addibot related to the metrology or related to the processing of the metrology data in some form 550A. In some examples, these metrology steps may involve the measurement of surface topography in such a manner as to identify cracks and holes or potholes in the surface of a roadway.

Additionally, at 550A, in some examples the Addibot may process the result of the metrology by means of a processor.

The processor may in some examples identify the presence of a crack or other defect, determine a need for such a feature to be filled or otherwise have action performed on it, and then establish the location information for the feature detected.

At 560A, in some examples the Addibot will utilize the information that it has received in various manners about the surface and any desired model that results from this information and based on a digital model provide controlling signals to the additive manufacturing system. The controlling signals may cause a component to release material onto the surface at a prescribed time as the component becomes located over a desired location.

At 570A, in some examples, the Addibot will deposit a first layer of material on a surface. In some examples, the first layer of material may include adhesives or sealers. In some other examples, the first layer of material may include a mixture of aggregate or small solids and an adhesive or sealing agent. In still further examples, the adhesive or sealing agent may be further processed by exposure to an energy source such as a UV light exposure to initial a polymerization reaction in the material.

At 535A, there may be a loop process that occurs in some examples and under some situations that may cause the Addibot to return to step 530A and continue processing. In an alternative example, in some examples, as shown at 545A a loop process may occur that may cause the Addibot to return to step 540A and continue processing.

At 580A, a step may occur where the Addibot is moved from a first location to a second location. In some examples, a characteristic of this movement is that as part of the Addibot moving the additive manufacturing system moves from a first location to a second location. This movement of the entire Addibot occurs even if portions of the additive manufacturing system could move some or all of the printing head or other additive element to the same second location without a movement of the Addibot.

At step 590A, the Addibot may deposit at the second location a second layer of material. The nature of the second deposit may include a different material, or a same material. The nature of the second deposit may include a different physical characteristic such as thickness or the same characteristic as a first deposit. The second deposit may be contiguous with a first deposit but be located at a second location and be considered a second deposit, by the very nature of being at a second location.

Referring to FIG. 5B, at 510B, an Addibot of a particular type may be obtained by a user. Next, at step 520B the user may transmit a control signal to the Addibot. The transmitting may involve numerous means including a wireless transmission, a wired transmission or a transmission involving a physical interaction such as pushing a switch or a display panel of an Addibot. The initiation signal may cause a variety of responses that are proximately caused by the initiation even if further interaction with the user is or is not required or if the Addibot will flexibly respond to its environment or programming thereafter.

At 530B, in some examples the Addibot may perform an orientation step. This step may assess one or more of determining a spatial location in a spatial coordinate system and may also assess movement and direction of movement or potential movement in a spatial coordinate system.

At 540B, in some examples the Addibot may perform a metrology process on a region of a surface. In other examples at 540B an apparatus external to an Addibot may perform a metrology process on a region of a surface and may communicate information to an Addibot related to the metrology or related to the processing of the metrology data in some form 550B. In some examples, these metrology steps may involve the measurement of surface topography in such a manner as to allow for the adjustment of the level of a forming mold as it is placed to interact with the surface.

Additionally, at 550B, in some examples the Addibot may process the result of the metrology by means of a processor. The processor may in some examples identify the level of the surface. In other examples the processor may identify the presence of a crack or other defect, determine a need for such a feature to be filled or otherwise have action performed on it, and then establish the location information for the feature detected. In some examples, the detection of a defect may cause the Addibot to send a signal and wait for a user to interact with the Addibot for additional controls.

At 560B, in some examples the Addibot will utilize the information that it has received in various manners about the surface and any desired model that results from this information and based on a digital model provide controlling signals to the additive manufacturing system. The controlling signals may cause the Addibot to adjust the level of components within the Addibot; or the level of the Addibot frame itself.

At 570B, in some examples, the Addibot may create a first structure by extruding material into a forming mold. In some examples, the first layer of material will include thermoplastics or other extrusion materials. In some examples, the Addibot may fill a portion of the resulting formed structure with wall forming materials such as cement. In other examples, the Addibot may signal the completion of a first structure formation and another device or another Addibot may add wall forming materials to the thus formed structure.

At 535B, there may be a loop process that occurs in some examples and under some situations that may cause the Addibot to return to step 530B and continue processing. In an alternative example, in some examples, as shown at 545B a loop process may occur that may cause the Addibot to return to step 540B and continue processing.

At 580B, a step may occur where the Addibot is moved from a first location to a second location. In some examples, a characteristic of this movement is that as part of the Addibot moving the additive manufacturing system as a whole moves from a first location to a second location even if portions of the additive manufacturing system could move some or all of the printing head or other additive element to the same second location without a movement of the Addibot. Forming mold pieces that may be present in the Addibot may be moved vertically upwards and downwards in the process of readying the Addibot for movement and then preparing the Addibot for a next processing step.

At step 590B, the Addibot may create a second structure by extruding material into a forming mold at the second location. The nature of the second structure formed may include a different material, or a same material. The nature of the second structure formed may include a different physical characteristic such as thickness or the same characteristic as a first deposit. The second structure formed may be contiguous with a first structure formed but be located at a second location and be considered a second structure, by the very nature of being at a second location.

Materials, Structures, Designs

There may be numerous possible material structures to be used by an Addibot in the repair or construction of roadways or more generally in the deposition of materials itself. These material structures may include multiple constituents in their composition, with primary materials including those used for asphalt, concrete, or other types of road constructions. As used herein asphalt may refer to naturally occurring asphalt or polymer modified asphalt or bitumen as well as mixtures of various kinds which include asphalt as a component. Referring to FIGS. 6A-6H, an exemplary set of material designs that may form a discrete structure for depositing with an Additive Manufacturing Array (AM Array), or other material distribution system are displayed. Additionally, FIGS. 7A-7D display an exemplary set of feedable forms of material designs for depositing with an extrusion head, or other material distribution system. These material designs are shown in the aforementioned figures with non-limiting but exemplary composite forms; in practice, these material designs may be more complicated, with different material distributions than shown in the exemplary figures. Alternatively, they may be more uniform in design than depicted.

Figure 6C:
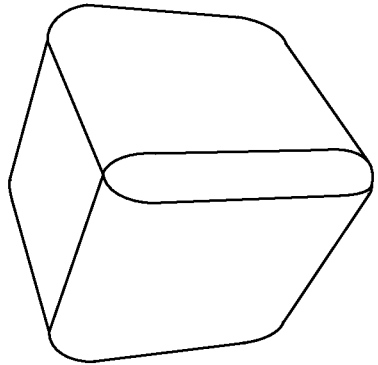
FIGS. 6A-6H—illustrate exemplary composite materials designs for discrete structure.
Figure 6D:
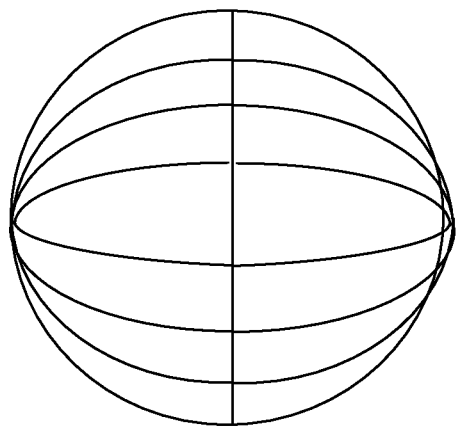
Figure 6A:
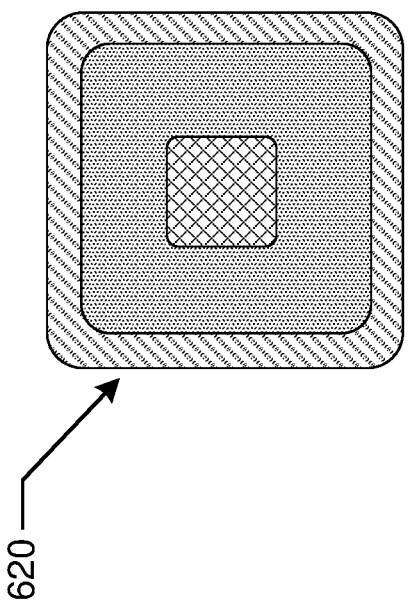
Figure 6B:
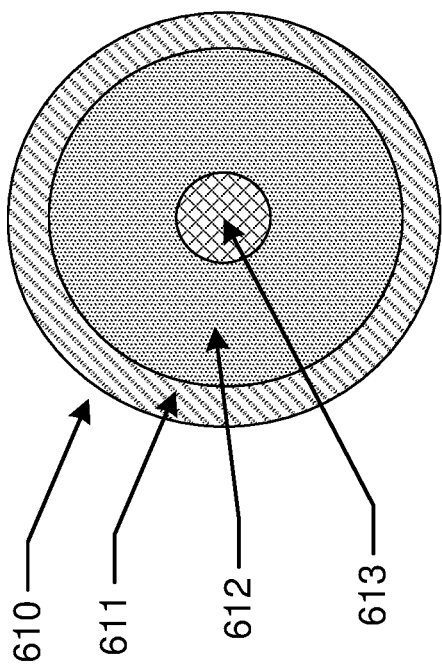
Figure 6G:
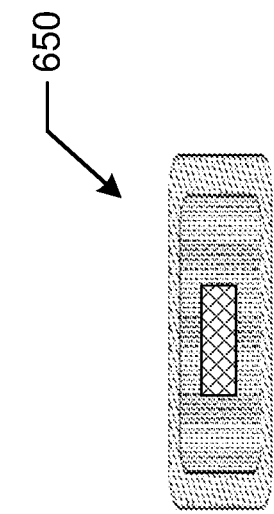
Figure 6H:
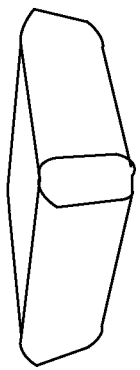
Figure 6E:
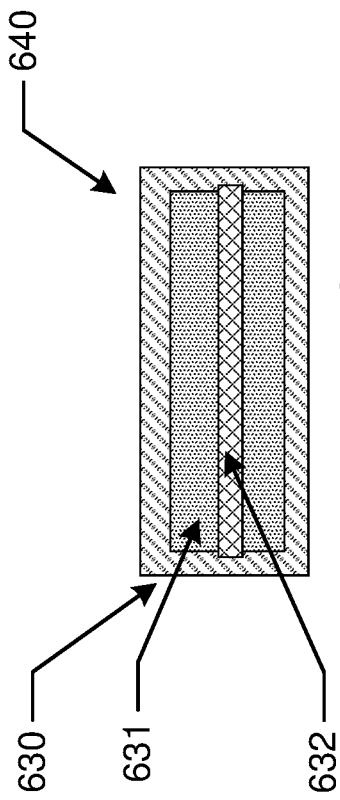

Referring to FIGS. 6A-6H, exemplary discrete composite material design structures are displayed; these structures each may have similar exemplary material composition, in terms of layering patterns, relative mass ratios, and other characteristics, but different exemplary cross sections and overall shapes are shown among the various figures. This exemplary material composition, as a non-limiting example, may be shown by FIG. 6A; an outer material shell 611 may surround an inside material layer 612, surrounding an inner material core 613. Each of these layers may include different materials. For example, the outer material shell 611 may be of much smaller thickness than the other material layers and may include a material, like paraffin wax, that may have different thermal properties than the other material layers, such that it has a lower melting point then the other layers. The inside material layer 612 and inner material core 613 may include materials that are consistent with the road construction they are being used for. With asphalt road constructions as a non-limiting example, the inside material layer 612 may include a bituminous tar material and the inner material core 613 may include a mineral aggregate material chosen for the road construction. In some examples, the aggregate may be coated with asphalt. It may be common for the inner material core to include the bituminous tar material while the inside material layer 612 may include mineral aggregate material which may be coated in asphalt containing material. This concentric material layout shown in FIGS. 6A. 6C, and 6G may be desired for certain road construction types, however, as seen in FIG. 6E, other material layouts may be possible. For example, the material composition of FIG. 6E, in terms of the chosen materials, may be consistent with that of FIG. 6A, with a similar outer material shell 630, and inside material layers 631 and inner material core 632; however, the inner material core 632, in this arrangement, may be seen to split the inside material layers 631 into 2 discrete layers. This arrangement may function to increase the surface area of contact between the layers for this cross section or suit other desired purposes. In other exemplary arrangements, the inside material and inner material core may not even be discrete layers or shells, but may be uniformly mixed, with this uniform mixture contained by the outer material shell 611, 630. There may be variations that include additional or fewer layers. Furthermore, in some examples the order of layers may be changed from those discussed in the above examples.

Figure 6F:
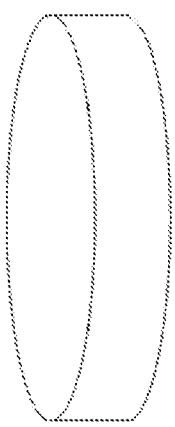

As mentioned, FIGS. 6A-6H demonstrate exemplary cross sections and overall shapes for discrete composite material design structures. FIG. 6A demonstrates an exemplary circular cross section 610 of a discrete composite material design structure in the shape of a sphere (FIG. 6B). FIG. 6C demonstrates an exemplary square cross section 620 of a discrete composite material design structure in the shape of a cube (FIG. 6D). In this example, the edges and corners are shown to have a fillet of some radius; this radius may vary in practice. FIG. 6E demonstrates an exemplary square cross section 640 of a discrete composite material design structure in the shape of a disc (FIG. 6F). FIG. 6G demonstrates an exemplary rectangular cross section 650 of a discrete composite material design structure in the shape of a rectangular prism (FIG. 6H). In this example, the edges and corners are shown to have a fillet of some radius; this radius may vary in practice. These examples may be seen as non-limiting. There may be other cross sections and overall shapes of discrete composite material design structures that may exist in practice. The discrete parts may be fed into additive manufacturing arrays for individual deposition from select array elements.

Referring to FIGS. 7A-7D another type of material format may be found. Unlike the discrete examples, the materials illustrated in FIGS. 7A-7D represent continuous feed examples. For example, referring to FIG. 7A an exemplary cross section 710 for continuous feed formats may be found with internal structures made up with asphalt layers and aggregate with coated asphalt in non-limiting examples. The aggregate may be chosen from a select particle size and/or a distribution of particle sizes. In some examples, the distribution may be related to the ability to continuously feed asphalt and aggregate material into holes in roadways.

Figure 7A:
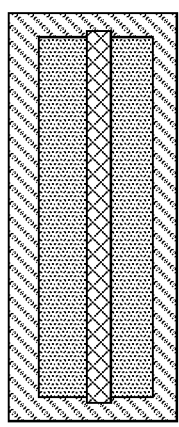
FIGS. 7A-7D—illustrate exemplary composite materials designs for feedable forms.
Figure 7B:
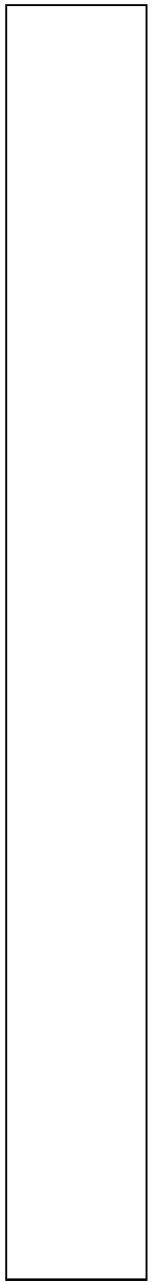
Figure 7C:
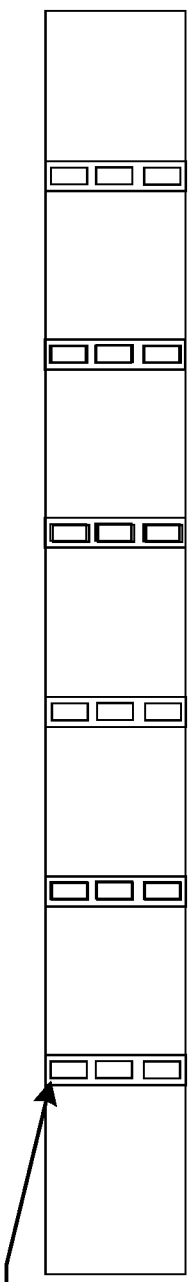
Figure 7D:
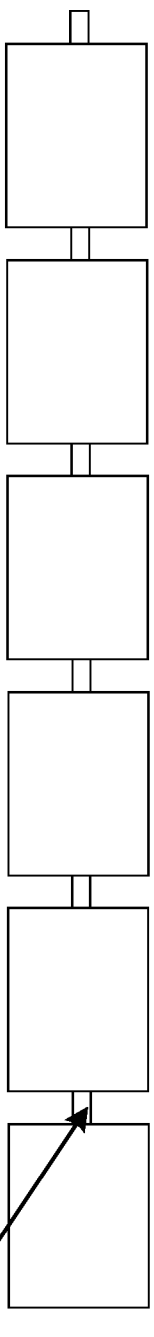

Referring to FIG. 7B an example of a single filament type structure with an internal structure such as in examples 7A. In example 7C an alternative 720 may be demonstrated where edges of a flexible outer coating material may close on themselves such that collections of deposition material in chunks may be continuously fed, yet they may be connected to each other. As a model example, the material form may be like ravioli form pasta. In another example, the material form may be like connected sausages. Another example of interconnected pieces may be found in reference to FIG. 7D where a thin filament form 730 of material may interconnect discrete quantities of roadway filling material. In other examples, the form factor may include material related to other applications than roadway repair such as depositing materials for large product printing or structure building.

In some examples, a filament form structure may include an outer layer of thermoplastic material surrounding a core of metallic material. The core of metallic material may be found in numerous forms including power, solid strand, and mesh of strands of metallic wire as non-limiting examples. A strand of wire mesh surrounded by asphalt and a thin coating layer may be used to imprint wire form materials upon a roadway surface. In some examples, the imprinted wire form may be placed upon the roadway or repaired roadway surface or it may be buried in a channel that may be cut into the roadway while processing is performed. Numerous examples of material may be formed into structures as depicted which may then be deposited upon a surface in a continuous controlled manner similar to the deposition of material in a typical commercial FDM 3D printer. In some examples the strands of material may be as large as or large than a diameter of one centimeter. In other examples the strand may have a diameter of 5 centimeters or larger. In some examples, thinner strands of filament formed material may be wrapped around each other to form larger formed material. In the examples with perforations or thin tabs connecting segments of the material, the perforations or tabs may impart the ability of the material to be stored by wrapping it around cylinders that may be uncoiled during use.

There may be many materials incorporated into filaments and segmented filaments as described. The core composite materials may include asphalt, asphalt coated aggregates of stone or other solid materials which may be sorted in size distribution or sorted to a small dispersion around a targeted size. Other core materials may include cement mixtures. Other examples of core materials may include metals, fibers of plastics, fibers of nanostructure materials including graphene and carbon nanotubes where the fibers may be small diameter fibers impregnated in other fibers, natural fibers, natural fibers treated with or impregnated with other materials to make them conductive or to add strength, elasticity, or other physical properties. It may be apparent that the component that distributes material of the various forms may distribute more than one material form in a surface region of interest simultaneously.

There may be numerous materials for surrounding layers, including adhesives, solvents, and other fluids that may interact in some examples with the core materials. The examples of surrounding layers may include asphalt, epoxies, cyanoacrylates, silicones, gels, hydrogels, and monomer forms of various polymers which may be thermally activated, photo-activated, or chemically activated in non-limiting examples. Thermoplastics such as ABS, Nylon, PLA, Acrylic, Polybenzimidazole Polycarbonate, Polyether sulfone, Polyether ketone, Polyetherimide, Polyethylene, Polyphenylene oxide, Polyphenylene sulfide, Polypropylene, Polystyrene, Polyvinyl chloride, and Teflon may provide non-limiting examples. Adhesives may also be included which may or may not have thermoplastic characteristics. The Adhesives may include non-reactive adhesives, drying adhesives such as solvent based adhesives, contact adhesives, rubber cements, polymer dispersion adhesives, pressure-sensitive adhesives, contact adhesives, hot adhesives or hot melt adhesives, multicomponent adhesives in addition to epoxies may include urethanes and acrylics, single component adhesives which may react upon exposure to radiation, solvents, chemicals, moisture, or thermal processing. Photo-curing may be provided by light from various spectral frequencies including ultraviolet and visible spectrum frequencies as non-limiting examples.

In some examples the outermost layer may include materials for unique interface characteristics to the ambient and to the equipment used by an Addibot. The outer layer may include solid formed material, elastomers, and thermoplastics as non-limiting examples. Some examples may include polymer modified asphalts that impart flexibility and strength to the thin layer formed. Paraffin and paraffin based products such as paraffin enhanced with cellulose and other sealing materials. In some examples the sealing materials may be chosen to co-melt into the internal structures of the discrete pieces such as the examples of FIG. 6A-6H, or the filament type examples of FIG. 7A-7D. In some example, thermoplastic elastomers in sheet form may be used for a thin external sealing surface of the material structure. Various shrink wrap films and composite film combinations may be used for an external layer. Some polyolefin materials may enhance the properties of a modified asphalt binding layer for a roadway, and their use as an external layer may result in favorable properties first as a sealant and then as an incorporated portion of an asphalt based deposit.

Additive Manufacturing Array—Heating

Figure 8:
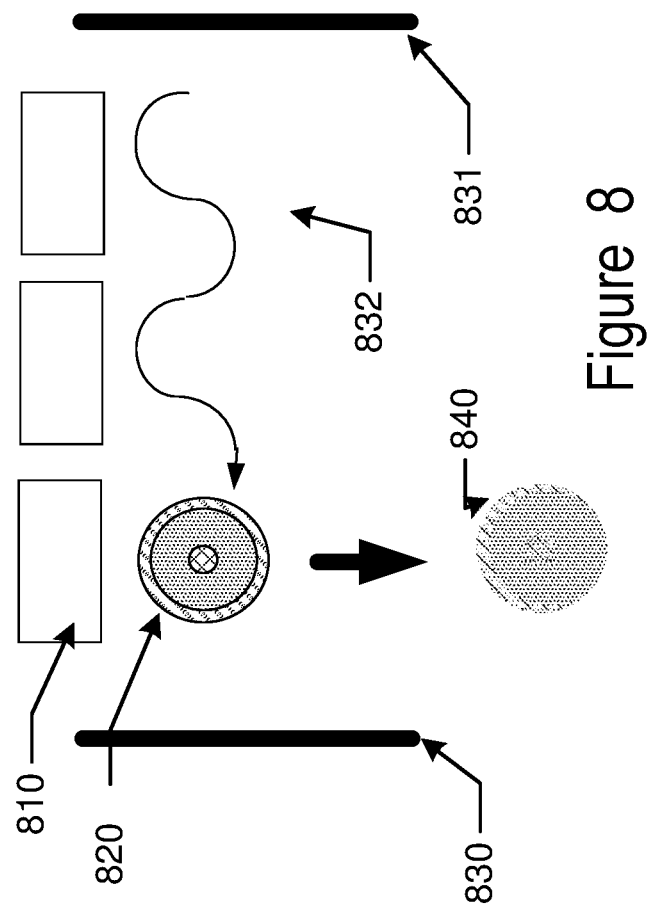
FIG. 8 illustrates an exemplary discrete form AM Array composite material distribution apparatus.

Referring to FIG. 8 an example of an AM Array that may process discrete material pieces may be found. Although the AM Array may function similarly for liquid form bulk material being fed into it, discrete pieces 820 are illustrated. The discrete pieces 820 may be of the exemplary spherical type as shown in cross section in FIG. 8. A distribution element 810 may release a discrete piece 820 to fall onto an underlying surface. In the distribution element and in storage locations before the distribution element, the pieces may be heated above ambient conditions but below a temperature where the external encapsulation layers of the discrete piece 820 may either co-melt into other materials in the discrete piece or may rupture or dissolve. As the discrete piece 820 falls, it may fall through a zone between a heating system denoted by plates 830 and 831 where the heating energy may be depicted as energy 832. In some examples, the heating system may emit microwave energy. The frequency of the microwave energy may be engineered to interact with the discrete piece in a defined manner. In some examples, the microwave energy may be absorbed by aggregate material within the discrete piece 820. In other examples, the microwave energy may be tuned to be absorbed by other layers, such as a layer of asphalt within the discrete piece 820. In still further examples, the microwave energy may be provided in a broad enough spectrum to interact with multiple layers within the discrete piece 820. As the discrete piece 820 absorbs the microwave energy it may be heated and reach a desired temperature to be further processed after it interacts with the underlying surface. The discrete piece may then become an intermixed discrete piece 840. The temperature may induce other changes including the co-dissolving of layers into each other and the rupture or dissolution of the external layers due to the temperature increase or pressure increase in the discrete piece 820 due to the temperature increase. Other heating systems may also heat the material in other ways including radiant heating, conductive heating, convective heating, or absorbed energy heating as non-limiting examples.

Continuous Heating and Extrusion Source

Figure 9:
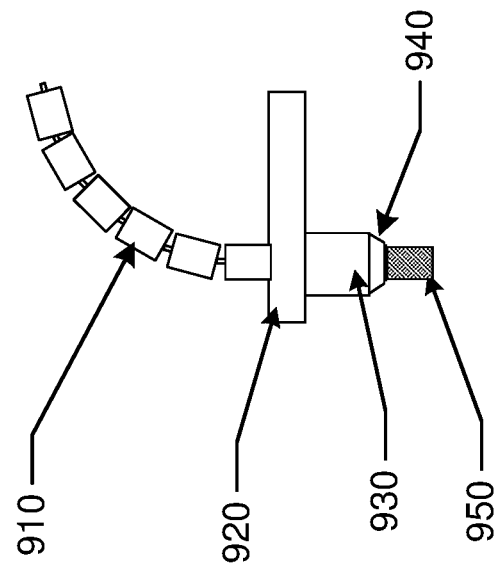
FIG. 9 illustrates an exemplary continuous extrusion/heating source material distribution apparatus.

Referring to FIG. 9, a continuous feed heated extrusion source of filament type material systems is illustrated. The material may be a thin filament form of continuous feed material 910. That is advanced or fed by a feeding mechanism 920 which will press the material forward into the heating mechanism 930. The heating mechanism 930 may heat the material by conduction from a heating source. In some examples, the material may be heated with absorbed radiation such as microwave radiation. There may be combined manners to heat the material in the heating source. The pressure on the material in the heating source may force the material out of an extrusion head 940. The resulting extruded material 950 may include the various types of materials that have been discussed previously and may adhere and fill in feature on the surface that is printed upon.

Exemplary Vision and Deposition System

Figure 10:
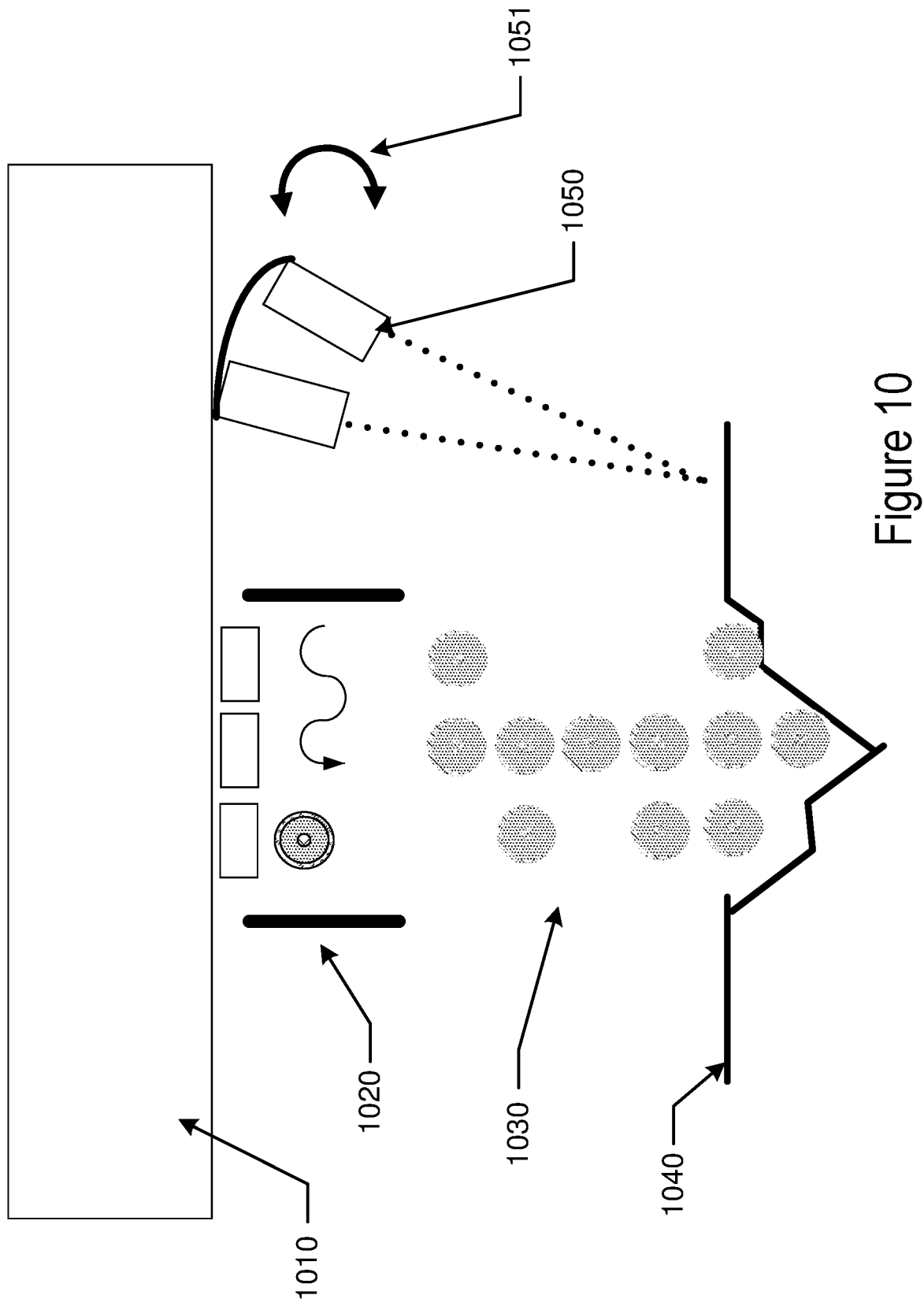
FIG. 10 illustrates an exemplary distribution apparatus coupling vision and deposition systems.

Referring to FIG. 10 an Addibot 1010 may include an AM Array 1020 and an exemplary vision system 1050. The vision system 1050 may scan 1051 a surface under the Addibot 1010 and determine a depth of material to add to the surface. In some examples, the vision system may include stereoscopic cameras that may map and allow for the depth of feature calculation. In other examples, the vision system may include a laser coherence depth measurement system. In other examples, the vision system may include a wavelength scanning interferometer. In other examples, the vision system may include an ultrasound imaging system.

An algorithm may convert the observed depth and the speed of the Addibot along with its calculated location in reference to the image derived. The algorithm may be used to control the Amar ray to release discrete material elements 1030 through the local heating region into a crack or hole or another defect of a surface 1040. As can be seen some location will have more material or less material released depending on the topography of the features on the surface as observed in a depth profile by the vision system. In some examples, different sized discrete material elements may release different sized material elements to allow for more flexible filling. In some other examples, different material elements may have different materials within them or different ratios of material within them.

Advanced Roadway Construction with Addibots

Figure 11A:
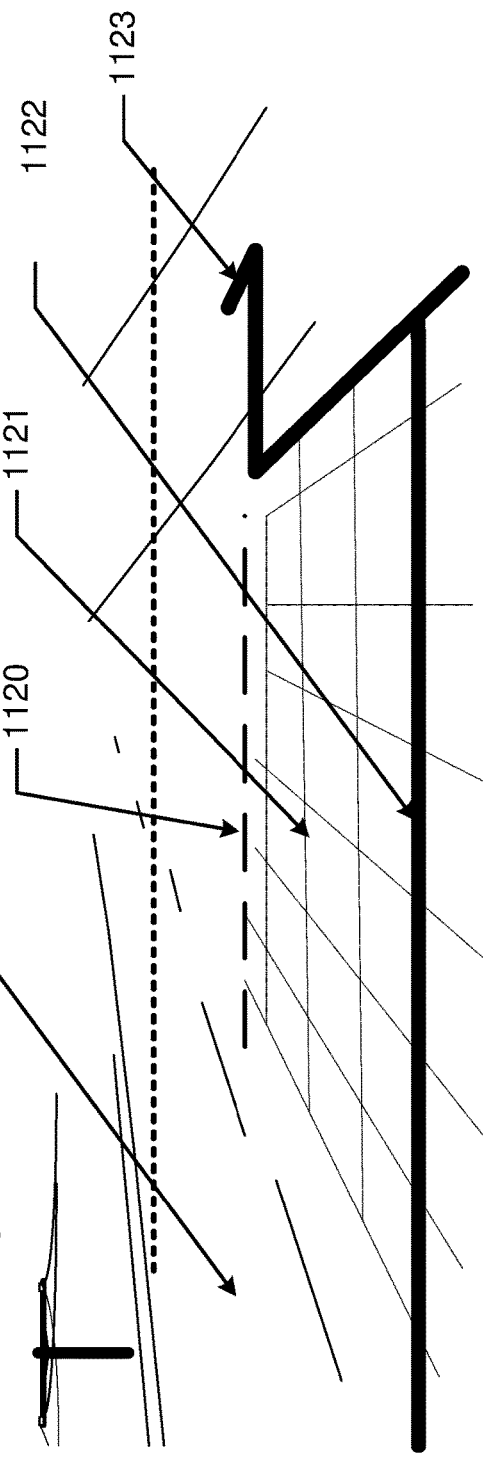
FIG. 11A illustrates exemplary advanced roadway structure that may be formed by Addibots.

Examples of structure building with extrusion components within an Addibot have been described in the recent section. Different versions of extrusion components may be used to construct advanced roadways as well. Referring to FIG. 11A, some features that may be produced by an Addibot configured to support roadway construction may be observed. A roadway 1110 may be formed in the various standard manners that such surfaces are constructed. There may be an interface 1120, where a roadway according to the present disclosure has an advanced formed base with a filled bed material. Thereafter, Addibots may extrude various structural features. As an example, some roadway designs require the possibility for a roadway to expand under heat with expansion joints or other expansion elements. In some examples, an Addibot may extrude a feature at a location along the roadway surface. The location of the feature may be present in a model of the roadway that exists in Addibots and controlling apparatus for an Addibot or combinations of Addibots. The extruded feature may, as an example, be a channel that is formed at the full height or nearly the full height of the roadway bed when the roadway is completed. In some examples, the channel may be filled with a material. In some examples the material filling the channel may be a sealing material that may flexibly deform under thermal load and various pressures and forces from both the roadway and eventual traffic along the roadway. In some examples, the material filled into the channel may be a material such as a salt that will dissolve under the action of water to expose a well-controlled gap in the roadway.

Addibots may be used to extrude supporting meshes 1121 of various kinds, shapes, and designs. In some examples an extrusion pattern may be a cross-hatch pattern. A cross-hatch pattern according to this disclosure is a pattern where two or more features of the pattern approximate intersecting lines. In other examples a unit cell pattern, where a unit cell pattern means a pattern where portions of the pattern are repeated, a beehive pattern or various other patterns that could be useful in supporting a roadbed under the various stresses that it is exposed to. In some examples, the extruded material may be a composite of molten material with embedded fibers, nanofibers, nanotubes, and other materials which may increase strength, flexibility, ability to stretch and other material characteristics that may be desirable for a supporting material which may be embedded in a roadbed. In some examples, the bed of the roadway may be comprised of asphalt of a given thickness. As an example, consider a bed of 6-inch thickness asphalt. In some examples, the extruded supporting material may be a full six-inch thickness, a portion of the six inches, or in some examples, the roadway may be formed in multiple levels each one having another extruded layer. In some examples, the extruded material may be formulated with supporting material embedded within where the molten material may be chosen to mix into the hot asphalt fully or partially as it is laid. A partial melt of the material may leave a strengthening pattern of fibers, nanotubes and the like within the roadway yet not create significant gaps within the roadway bed.

Another feature that may be added to the roadway surface may be a channel 1122 that may be used to embed materials such as conductive material within a roadway. There may be numerous uses for embedded conductive material including sensing of various kinds, communication interface through wireless means and communication routing along the roadway. As shown the channel 1122 may route electrical connections along a roadway and may also route them to the side of the roadway at side channel 1123. The extrusion techniques and apparatus may be used to form channels as portions of the deposited material. The channel may contain electrically conductive material with other materials as well. In some examples, the channel may contain communication devices such as optical fiber. The optical fiber may route signals along the roadway as well as to devices along or embedded within the roadway. The channel may be filed with insulating materials of various kinds and in some examples, portions of the channel may also be topped with structures that act as antenna. In some other examples, the channel may be layered with different layers of materials, some of the layer may contain and insulate metallic wires, optical fiber, and other such active components.

Figure 11B:
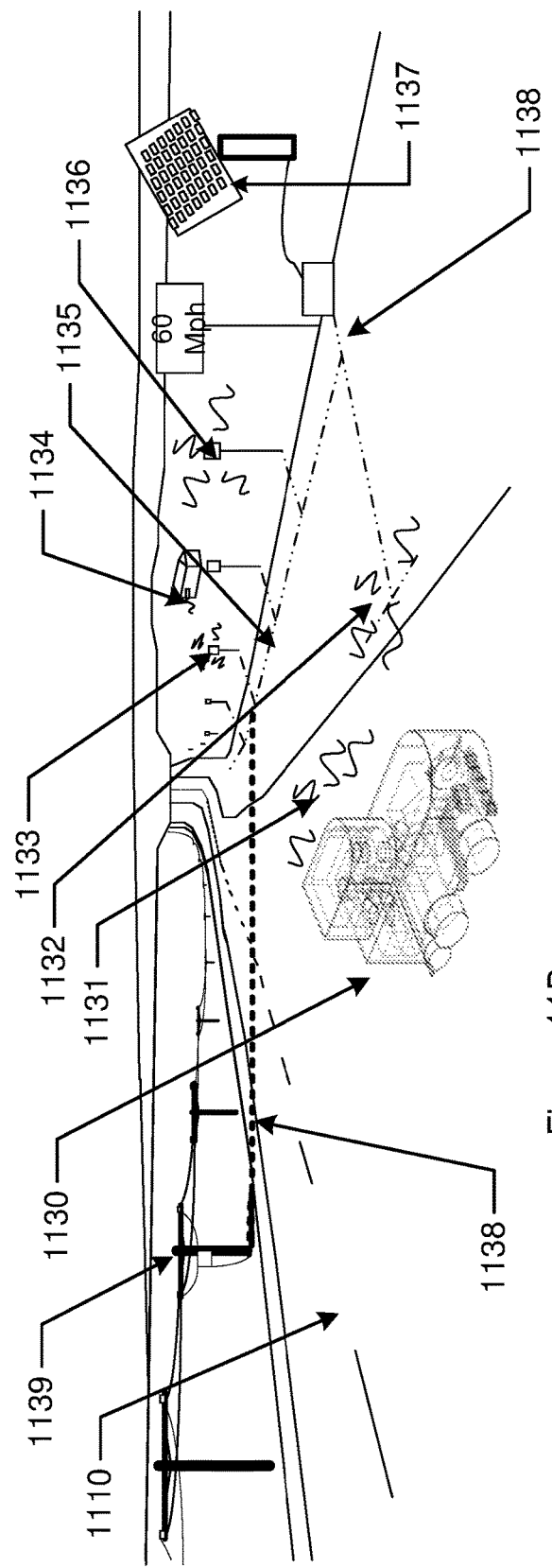
FIG. 11B illustrates an exemplary Addibot in concert with features of an advanced roadway.

Referring to FIG. 11B, an advanced roadway 1110 in conjunction with an Addibot 1130 is depicted. In some examples, an advanced roadway may have been formed with use of Addibots in a manner as described. The roadway may be formed with embedded sensors, antennas, or other devices for facilitating communication 1131 between an Addibot 1130 and the advanced roadway 1110. Within the advanced roadway 1110 may be communication devices 1132 that may be buried within the roadway, the shoulder or the side of the roadway or be upon these locations. In some examples, there may be communication devices on roadway poles, signs, and the like. The communication 1131 may comprise wireless communication and may involve radio frequency, infrared frequency, optical frequency, or other forms of wireless communication. In some examples, the advanced roadway may be formed with embedded fibers 1135 formed of conductive materials or optical fiber. The embedded fibers 1135 may also be considered wires. There may be connection of wires 1138 to power sources along the roadway. The power sources may be standalone sources such as solar panels 1137 or be connected to power transmission grids 1139.

Communication signals may be routed through the advanced roadway and shoulders of roadways as depicted in FIG. 11B. In some examples, the communication signals may be routed out of the roadway to a wireless transmitter 1133 located along the roadway. In some examples, signals may be transmitted from one wireless transmitter 1133 to another transmitter 1136. A combination of transmission through conduits in the roadbed and to roadside transmitters may be used to transmit signals of various kinds. In some examples the signals may relate to the movement of traffic along the roadway. The signals may also relate to conditions along the roadway as detected by sensors or traffic itself. In other examples the signals may involve communication signals unrelated to the traffic and may be standard communications that are routed along roadways. The signals from the roadside communication transmitters such as wireless transmitter 1133 may be routed to neighboring structures 1134 such as residences or businesses. The transmissions in some examples may comprise standard internet communication transmissions, or in other examples the signals may relate to traffic flow along the roadway. Autonomous vehicles may use the various communications and sensor pathways as part of technological support of the traffic flow. Signals from traffic may be routed from vehicle to vehicle with the support of the roadway communication system. And signals from traffic may be routed along wireless pathways to internet connections to central controllers for traffic flow that may be located at off road sites such as neighboring structures 1134. The internet connections may be used to transmit signals from and to remote control systems.

In an example related to FIG. 11B, the communication and control systems may be used to control repair of advanced roadways. Addibot 1130, may be guided to regions that need repair of various types. The need for repair may be detected in various manners such as for example sensors or image capture devices on traffic vehicles, control information provided by human inspectors or roadway users or the like. In another use of the communication infrastructure of the exemplary advanced roadway system, the Addibot can also receive location information from the information and communication systems of the advanced roadway.

Figure 12:
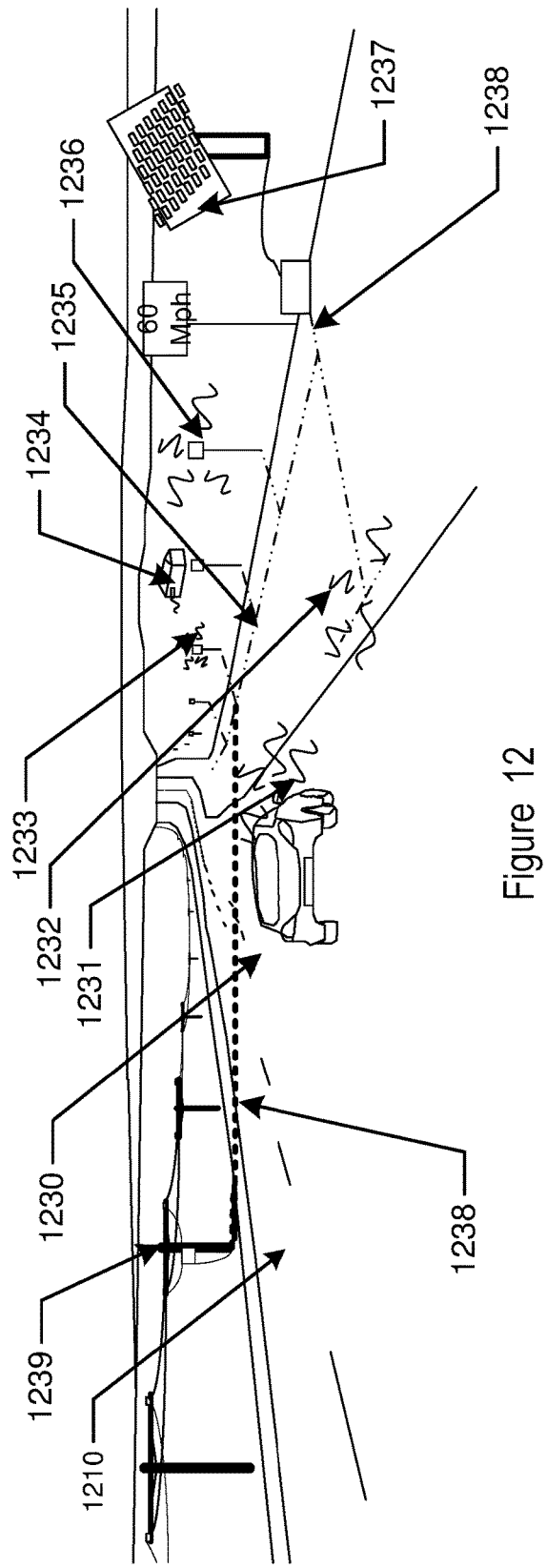
FIG. 12 illustrates an exemplary roadway in concert with an exemplary transportation vehicle capable of interacting with the advanced roadway in similar fashion to those capabilities employed by Addibots used in roadway construction and repair.

The interaction of an Addibot and an advanced roadway may be useful in both the respect of creating the advanced roadway and in repairing it. The resulting advanced roadway may also be useful for advanced vehicle operation as well. In a non-limiting example, driverless cars may receive communication, location information, intra-vehicle information sharing, guidance related information and the like through operation of the components of the advanced roadway as described herein. Referring to FIG. 12, an advanced roadway 1210 in conjunction with a vehicle 1230 is depicted. In some examples, an advanced roadway may have been formed with use of Addibots in a manner as described. The roadway may be formed with embedded sensors, antennas, or other devices for facilitating communication 1231 between a vehicle 1230 and the advanced roadway 1210. Within the advanced roadway 1210 may be communication devices 1232 that may be buried within the roadway, the shoulder or the side of the roadway or be upon these locations. In some examples, there may be communication devices on roadway poles, signs, and the like. The communication 1231 may comprise wireless communication and may involve radio frequency, infrared frequency, optical frequency, or other forms of wireless communication. In some examples, the advanced roadway may be formed with embedded fibers 1235 formed of conductive materials or optical fiber. The embedded fibers 1235 may also be considered wires. There may be connection of wires 1238 to power sources along the roadway. The power sources may be standalone sources such as solar panels 1237 or be connected to power transmission grids 1239.

Communication signals may be routed through the advanced roadway and shoulders of roadways as depicted in FIG. 12. In some examples, the communication signals may be routed out of the roadway to wireless transmitter 1233 located along the roadway. In some examples, signals may be transmitted from one wireless transmitter 1233 to another transmitter 1236. A combination of transmission through conduits in the roadbed and to roadside transmitters may be used to transmit signals of various kinds. In some examples the signals may relate to the movement of traffic along the roadway. The signals may also relate to conditions along the roadway as detected by sensors or traffic itself. In other examples the signals may involve communication signals unrelated to the traffic and may be standard communications that are routed along roadways. The signals from the roadside communication transmitters such as wireless transmitter 1233 may be routed to neighboring structures 1234 such as residences or businesses. The transmissions in some examples may comprise standard internet communication transmissions, or in other examples the signals may relate to traffic flow along the roadway. Autonomous vehicles may use the various communications and sensor pathways as part of technological support of the traffic flow. Signals from traffic may be routed from vehicle to vehicle with the support of the roadway communication system. And signals from traffic may be routed along wireless pathways to internet connections to central controllers for traffic flow that may be located at off road sites such as neighboring structures 1234. The internet connections may be used to transmit signals from and to remote control systems. In some examples, the communication infrastructure of the advanced roadway system may be utilized for data communications that are not related to traffic, repair, or other aspects of the roadway itself such as internet connectivity for residential and commercial operations within the vicinity of roadways.

Embedded Energy Generation Devices

Figure 13:
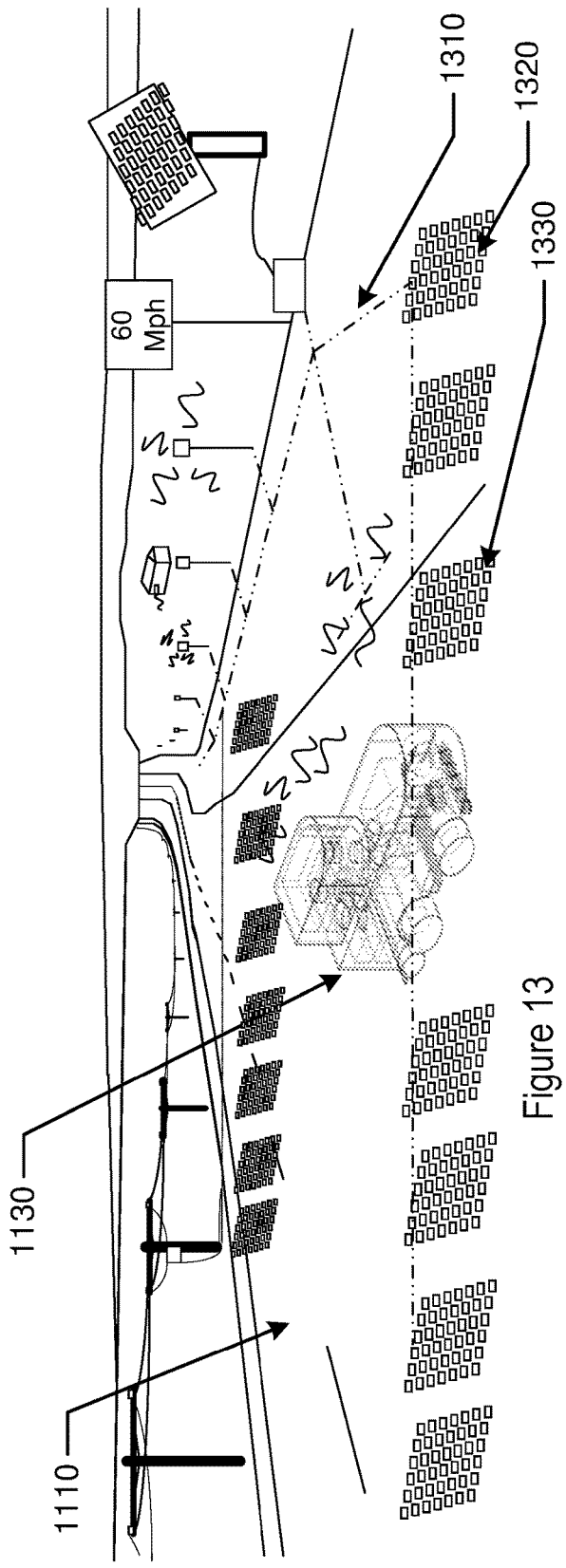
FIG. 13 illustrates an exemplary Addibot in concert with features of an advanced roadway including embedded photovoltaic or piezoelectric devices.

Referring to FIG. 13, an example of an Addibot assisting in the construction of roadways with embedded energy generation devices may be found. Photovoltaic devices may be able to generate electricity from solar incidence. The incorporation of photovoltaic devices into advanced roadways has been discussed in the reference specifications of the inventive entity. The deposition of specifically shaped or textured transparent films on the roadway surface and above the photovoltaic devices is further described herein. Additionally, Piezoelectric devices may be able to generate electricity from pressure applied across them. As a vehicle traverses a roadway, it imparts pressure to the roadway where its tires run. Thus, a piezoelectric material may be laid into the roadway and electrically connected to a power grid. In some examples, only standard locations where tires typically traverse the roadway may be laid, a task which is particularly suited for an Addibot. In continued reference to FIG. 13, an advanced roadway 1110 may have an Addibot 1130 placing photoelectric or piezoelectric panels on or within a roadway bed. The panels may be in a roadway lane 1330 or on the margin or shoulders 1320 of the roadway. The panels may be electrically connected within the roadway with conductive traces 1310 which feed into a communication and power grid. In the example of the photovoltaic panels, any surface material overlying the panels and isolating them from vehicle tires may be transparent materials. In a non-limiting example, a silicone layer may be deposited upon the panel. Due to weather, traction and other motivations, the deposition may in some examples have topology of ridges, bumps, and other protrusion above a flat surface. The additive manufacturing elements may deposit a standard pattern, or in concert with a vision system which may characterize the topology of the general area of the roadway surface a calculated deposition pattern may be applied by the Addibot. In the example, discrete locations of panels are depicted, it may be possible that an entire roadway is covered with energy generating panels in part or in whole. In other examples, only the margins or shoulders may be covered. In still further examples only the roadway surfaces are covered. In further examples, regions of the roadway surface that have less passes of tires upon them may be designed for the location of photovoltaic device location.

Embedded Charging Systems in Roadways with Addibots

Figure 14:
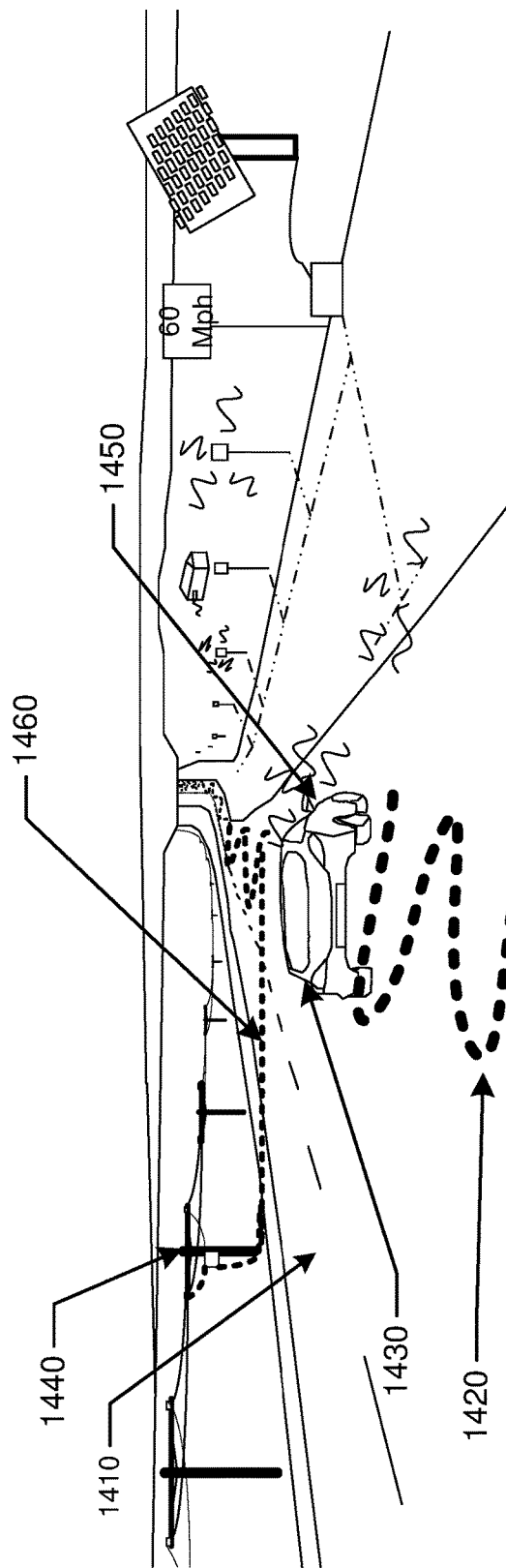
FIG. 14 illustrates an exemplary Addibot in concert with features of an advanced roadway including embedded electric vehicle charging components in roadway lanes.

Referring to FIG. 14, an example of a roadway with embedded charging systems within a lane or the entire roadway is illustrated. An advanced roadway with charging elements 1410 is depicted with an electric vehicle 1430. Within the roadway, a conductive and emitting power conduit 1420 may be found. In some examples, power from an electrical grid 1440 may be passed to control modules which then connect a supply power to the conductive and emitting power conduit 1420 through embedded conductive features 1460 in the roadway. The embedded conductive features may be one or more of wires or conductive films, or conductive deposits in some examples. An Addibot may be used to additively deposit the embedded conductive features 1460 for power supply as well as the conductive and emitting power conduit 1420 in the various manners have been previously described herein and in reference documents of the same inventive entity. In use, an electric vehicle 1430 may absorb energy transmitted from the roadway via the conductive and emitting power conduit 1420 and the vehicle receive the emanations 1450 from the roadway and convert them into stored electrical energy in the vehicle power train.

Communications Imbedded in Roadways connected to Broadcast Towers

Figure 15:
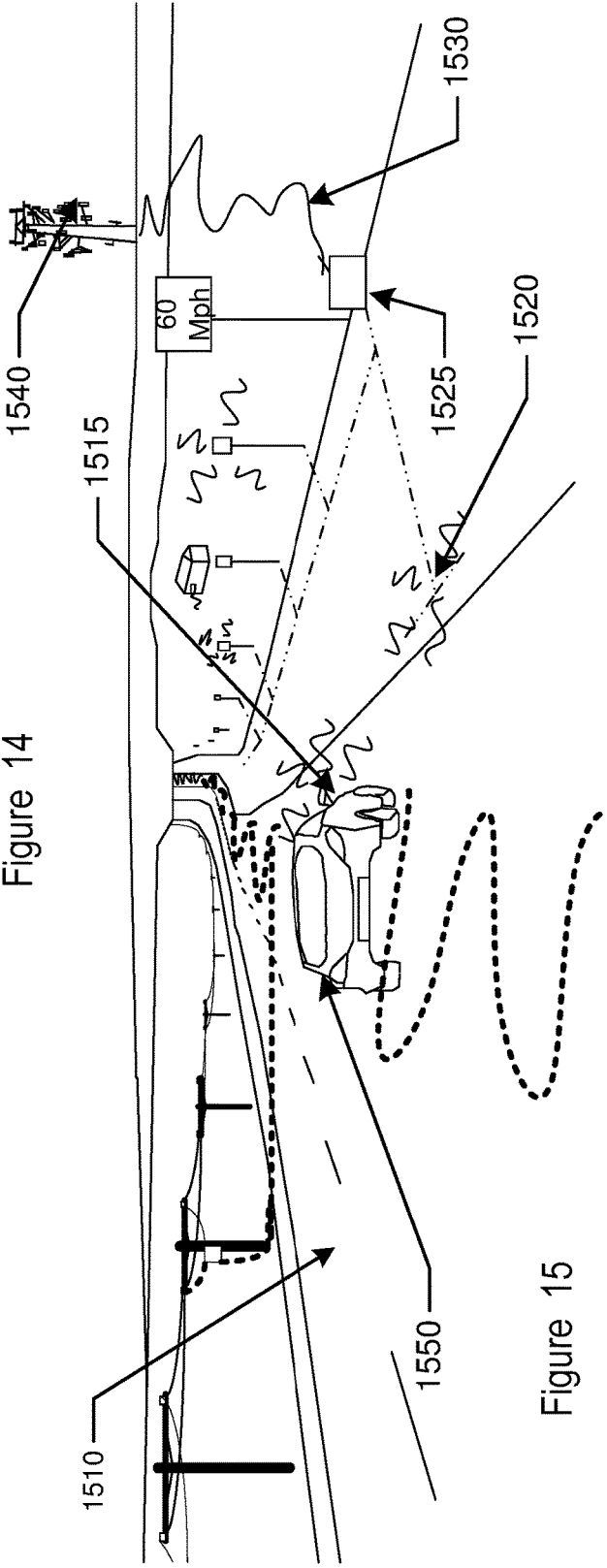
FIG. 15 illustrates exemplary communication modes for Addibots including car to road to cellular tower or broadcast tower devices.

Referring to FIG. 15, an exemplary advanced roadway with embedded communication wires 1510 which connect to broadcast towers is illustrated. A motor vehicle such as an automobile 1550 may traverse an advanced roadway with one or more devices within the vehicle or of the occupants that emit wireless signals 1515. The wireless signals may be received by antennas 1520 of various kinds or other types of receiving devices that are within the roadway, upon the roadway surface or mounted in proximity to the roadway in concert with a margin or shoulder. A signal received by the antenna may be conveyed by embedded conductors and conveyed by repeating devices 1525. In some examples, the signals may be routed to a broadcast tower 1540 which may comprise broadcast devices consistent with one or more communications standards with radio frequency, and other spectral band frequency in the infrared, visible spectrums for example. In some examples, the signals may be digital communications, in other examples, radio frequency analog such as amplitude modulation or frequency modulation may be employed. Cellular broadcast standards may be employed in some examples. In the illustration of FIG. 15, the broadcast tower 1540 is connected to the repeating device 1525 with a wired connection 1530. The example is illustrated with the automotive device located in relatively close proximity to the broadcast tower 1540. As the vehicle moves along the roadway it may become far enough away from the broadcast tower 1540 such that it may not be able to wirelessly communicate with equipment on the broadcast tower 1540. In these examples, the embedded roadway communication system may communicate to the motor vehicle and a signal may traverse a significant distance within the roadway communication system before it launches out of the roadway and in some examples to a communication tower or broadcast tower 1540.

Tethered or Trailered Addibot Devices

Figure 16:
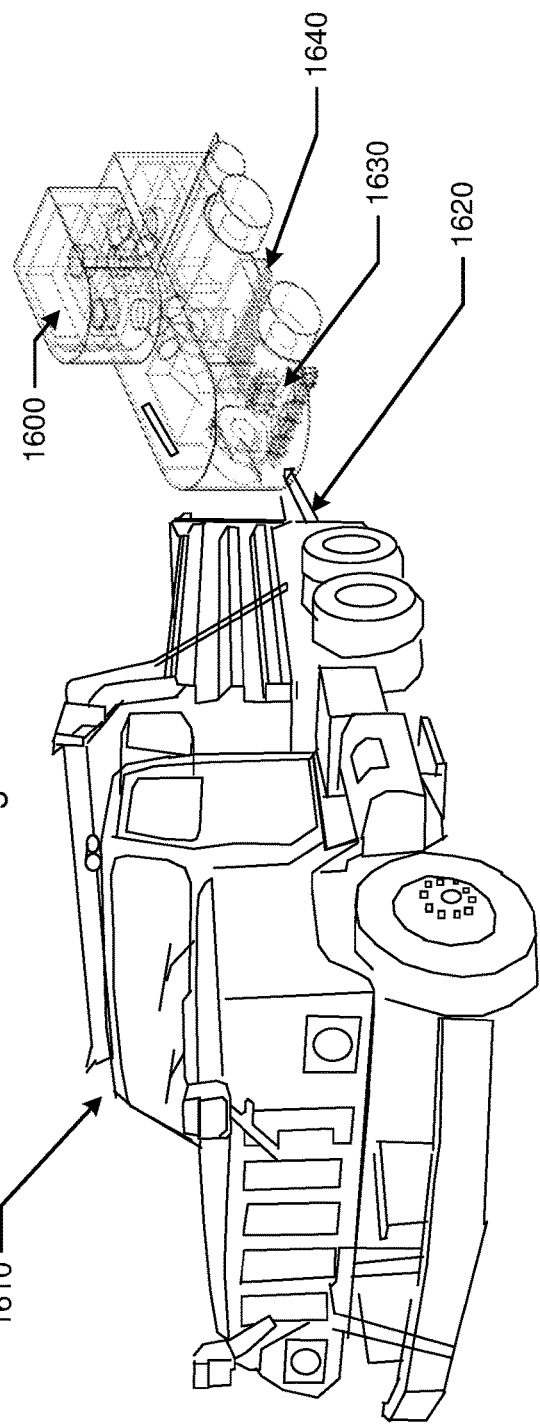
FIG. 16 illustrates exemplary Addibot configurations wherein the deposition system is towed or otherwise moved by another vehicle to form a system.

Referring to FIG. 16 an example of an Addibot 1600 device operating as a trailer to a construction vehicle 1610 is provided. The construction vehicle 1610 may be connected to the Addibot 1600 via a tow 1620 or tether device. In some examples, the lead vehicle may provide the mobility aspects to the Addibot system and may navigate and move the Addibot trailer to desired locations. The trailered Addibot 1600 may maintain some or all of the other functions except navigation and mobility with its own systems. For example, the trailered Addibot 1600 may have a vision system 1630 that may analyze the roadway surface as it traverses the roadway, identifying cracks, potholes and other features and defects which may have material deposited with an additive manufacturing element 1640, which in some examples may be a single extrusion or deposition element or in other examples may be an additive manufacturing array.

A "tethered" Addibot may appear similarly to the illustration in FIG. 16, but in addition to mobility and navigation, some or all of the material handling or storage may be contained in the lead construction vehicle 1610. FIG. 16, With an Addibot functioning in tandem with an external material handling and/or storage vehicle, this Addibot may be tethered, or otherwise connected to the external material handling and/or storage vehicle. In some cases, the material handling and storage systems may be contained on-board an Addibot; however, in other examples an external material handling and/or storage vehicle may function in tandem with an Addibot, this external vehicle may have the material handling and storage capabilities. In this case, the external vehicle handles the storage and materials processing and handling systems, routing processed material to the Addibot to be dispensed into the workspace. In some cases, both the external vehicle and the Addibot may have material handling and storage systems, either at the same scale and volume, or at different scales/volumes, or to handle different processing steps that are necessary for the material to be processed and ultimately added to the roadway surface.

In some examples, an Addibot or a lead vehicle may include some of the surface preparation systems that may prepare cracks for further processing. In some examples a pavement router, saw, laser cutter, flame treatment or other device may remove material and or dry pavement around a crack site. In some examples compressed air may be forced into the surface defects. The compressed air may be heated and may contain other chemicals such as steam in a non-limiting example. In some examples the entire pavement surface may be precleaned with one or more of the treatment options mentioned which may clean the defects, cracks, and hole features as well. Pressured water treatments or other solvents may also be performed in some examples.

In some examples of road constructions, depending upon the primary road surface material, which may include or combine asphalt, concrete, or other materials, the roadway construction may consist of multiple layers of applied material. These layers may include, as non-limiting examples, a sub-base, granular base, and top-road surface layers. Typical constructions may include these 3 (or fewer layers), but other types of road constructions, such as for airport runways, may have additional layers that create a more complex road construction.

A typical sub-base layer may comprise of material already present at a site. This material may include topsoil, loamy soils, rock formations, bedrock, or other soil mixtures and rock formations present in an area before construction. In many cases, the existing material may be satisfactory for a sub-base and may be processed by excavating tools to reach a desired thickness and surface altitude for the desired construction; in some of these cases, the layer thickness or surface altitude may not be satisfactory, and material may be added to the immediate construction area from other locations on the site that are not part of the eventual road construction. In other cases, the material available at a site may not have satisfactory properties, such as bearing capacity as a non-limiting example, to function as a suitable sub-base for the planned road construction. In these cases, as a non-limiting example, material may be excavated, removed from the site, and replaced with a more suitable material to a desired layer thickness and surface altitude; other methods also exist for replacing an un-suitable sub-base to construct a suitable sub-base for the road construction.

A typical granular base layer may include material brought to a site. This material may include, as a non-limiting example, a mineral aggregate mixture with granules with a diameter and density within a certain pre-determined range. This mixture may be of uniform mineral composition or may contain multiple types of minerals. The median of this granule diameter range may be large or small, depending on the specific application of the road construction, as well as the extent of the loads that will be incident on the surface; in many examples, this median granule size is typically smaller than that of the sub-base for bearing capacity considerations.

A typical top-road surface layer may include asphalt, concrete, or other material that creates a smooth and stable driving surface for a vehicle. With asphalt road constructions, this top-road surface layer may be a mixture composed of a mineral aggregate (of typically smaller granule size than that of the granular base layer) that can be any or a combination of stone chippings, sand, filling additives, or other material additives, along with a tar or bitumen product that acts as a binding material for these mineral aggregate granules. With concrete road constructions, this top-road surface layer may be a mixture composed of a mineral aggregate (of typically smaller granule size than that of the granular base layer) that can be any or a combination of stone chippings, sand, filling additives, or other material additives, along with cement that acts as a binding material for these mineral aggregate granules; this cement may be activated and mixed to a suitable consistency for construction with the addition of water. There may be many non-standard materials that may be added to a roadway construction through mobile additive manufacturing techniques. Some examples have been provided in referenced material, but for example strengthening materials may be printed or added upon the base layers before the top layer is added. In some examples, the strengthening material which may include metallic and inorganic fibers or may include nanomaterials such as graphene, carbon nanotubes and the like, may be included in a carrier material. The carrier and the associated strengthening material may be extruded or printed by an Addibot into patterns on the roadway, and in some examples the carrier material may co-melt with an elevated temperature application of a top layer. The carrier material may be a thermoplastic such as ABS for example, but various materials that have a melting temperature below a top layer application such as asphalt may be used according to the examples herein.

Many processing and handling steps may be considered when storing, transporting, or applying the various materials to a road construction. With regards to the sub-base layer, processing steps are typically destructive in nature, such as excavation, but may also be additive, such as depositing new sub-base material onto a work area. With regards to the granular base layer, these processing steps are typically additive and highly controlled in nature, where mineral aggregate granules of specified diameter are added to a workspace on top of the sub-base layer. The considerations for these diameter measurements chosen typically to relate to the compressive strain acting on a layer from the above layers and the loads upon the road, as well as the tensile strains acting at layer boundaries and within layers.

Typically, the most time intensive, labor intensive, and otherwise demanding processing steps occur with regards to the top-road surface. Work must go into making the specific material mixtures that are applied as the top-road surface. This work may include choosing and mixing materials of specified volume and density with specified ratios of each to create a mixture of desired average density, porosity, and other physical properties that may be desired for a road surface, depending upon its application. Depending on the mixture in question, whether asphalt, concrete, or other mixtures, different processing steps may need to be taken to create uniform consistencies of the mixtures that have been made. For asphalt, as a non-limiting example, the mixture may need to be set to a specific temperature to achieve a desired viscosity of the tar binding material. For concrete, as another non-limiting example, the mixture may need to have a specific water content, so that the cement may have a desired viscosity to act as a binding material. In transporting these materials to a worksite, or in applying the materials to a work surface at a site, other processing steps may need to take place to maintain the material at a desired consistency, among other physical properties desired for proper application. For asphalt, as a non-limiting example, the mixture may be set to a specific temperature to achieve a desired viscosity of the mixture as a whole. For concrete, as another non-limiting example, the mixture may be constantly agitated until application, so that it does not harden until it has been applied. As well, after these materials are applied to their desired locations, additional processing steps may be required to construct the proper road-top layers from the applied materials. For asphalt, as a non-limiting example, the asphalt mixture may be compacted to achieve a desired porosity (or lack thereof) of the surface. This may be typically done for asphalt with large rollers, where the rollers apply a combination of physical pressure and vibration to compact the layer; one of the most important aspects of this processing may be the vibration aspect of it, and this may be achieved with many other methods, including sound waves as a non-limiting example which may be included in the processing capabilities of an Addibot in addition to the ability to roll over a deposit with a rolling agitation device. For concrete, as another non-limiting example, the applied layer of material is typically quite smooth, which may result in a low surface coefficient of friction for tires of vehicles using the surface; this low friction environment may be a poor working environment for these vehicles, as they may slip over the surface, so the concrete surface may be roughed using brushes or other implements, to increase this friction. For material mixtures that are more fluid in nature, such as purely tar-based materials as a non-limiting example, additional processing steps or considerations may be important to the proper application of these materials. For example, with purely tar-based materials, in addition to being processed to a specific temperature, it may also be necessary to process the materials to a specific pressure. Addibots may provide some or all of the deposition steps, and some other processing steps, and they may act as single multiprocessing capability Addibots, or they may operate in teams of specialized Addibot processing tools.

Line Painting on Advanced Roadways

Figure 17:
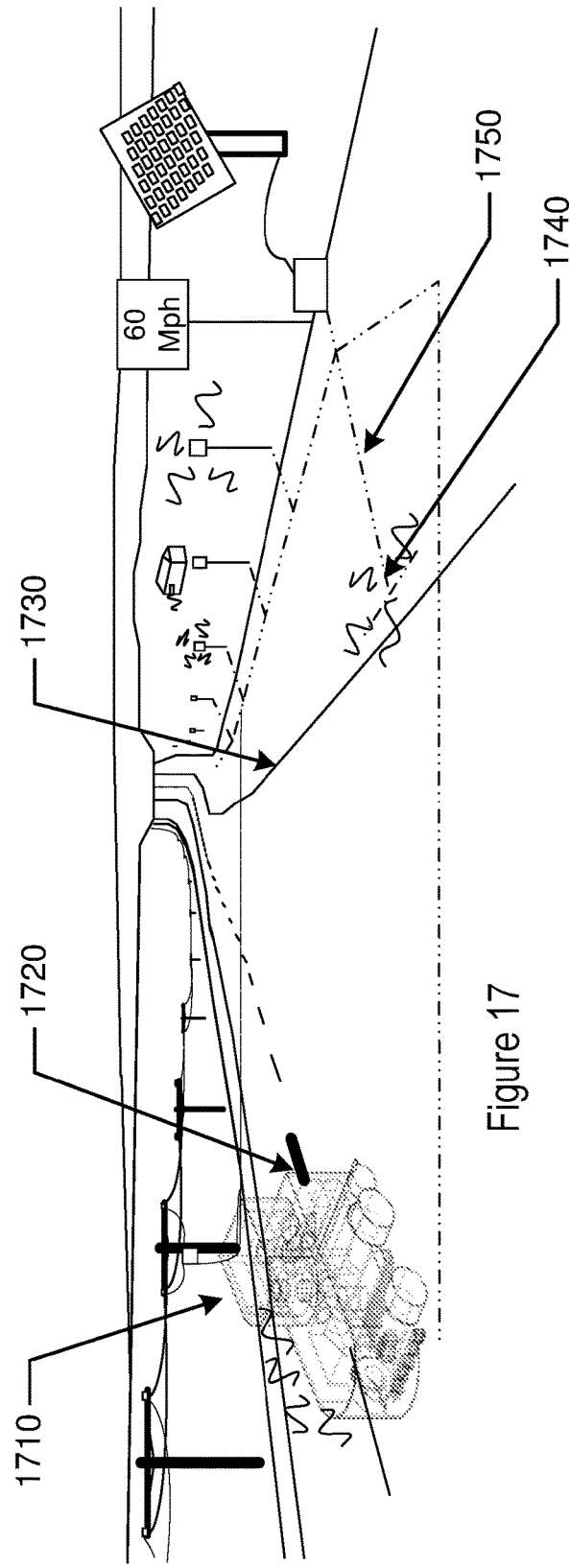
FIG. 17 illustrates exemplary Addibot configurations including the ability to place roadway lines.

Referring to FIG. 17, an example of an Addibot preparing signal lines on a roadway surface is illustrated. In the example, an Addibot 1710 may paint a signal line 1720 in the roadway such as a dividing line between lanes. The location, frequency, spacing, length, and the like may be controlled by the navigation system as well as the vision system. Boundary lines 1730 may also be drawn by the Addibot. In some examples, a line feature may be supplemented with more material being added to the bulk of the deposit such as raised features which may enhance the visibility of the line feature. Lines may be created with various forms of paint, thermoplastic, or other materials. The paint may include oil/solvent based paint including alkyd based, and chlorinated rubber types of paint. The type of paint may include water based paint which may have enhanced drying capabilities. The thermoplastic paints may include cold applied and hot applied thermoplastic paint. In some examples, paint including additives may be used such as reflective paints.

In some examples an Addibot may place discrete features under, into or upon a roadway surface. The discrete feature may be placed before a roadway surface is finished or afterwards. In some examples, an antenna structure may be formed into a block and placed within the roadway surface. In some examples, the Addibot that is printing lines such as boundary lines 1730 may place an antenna 1740 within the roadway. The antenna structure formed in a block may have incorporated electronics within the structure in some examples. The block may lay upon conductive traces in the roadway in some examples. In other examples, the Addibot 1710 may paint conductive connections between the antenna and embedded conductive features 1750 of the roadway. In some examples, the Addibot 1710, may paint a conductive feature and then may follow with a larger insulating feature upon the interconnection of the conductive painted feature.

Additive Manufacturing Robot with Composite Function

Referring to FIG. 18A a form of an additive manufacturing robot may be created by combining an additive manufacturing function 1840 such as a printing head or an AMARRAY with other roadway repair and construction functions. In some examples, the additive manufacturing function 1840 may be supplied with a filament form of material 1841 stored in a material storage hopper 1862. In other examples, an AMARRAY may be supplied with discrete material elements that may be stored in the material storage hopper 1862. The surface of the discrete material elements may be coated in a very thin polymer or powdered aggregate coating or other surface modifications that may ensure that the discrete material elements remain discrete and do not adhere significantly to each other.

Furthermore, a composite Addibot 1810 may include a cleaning function such as a pressurized water washing function. The cleaning function may be supplied with materials such as aqueous solutions from a material storage tank 1860. In some examples, cleaned material from the surface including some liquids and solids may be removed from the surface and stored in a refuse storage location 1861.

In other examples, the composite Addibot may also include a line or spray printing function 1820. The additive manufacturing function may be used to repair defects such as cracks and potholes or it may be used to lay strengthening material before a new layer of asphalt is laid. An additive manufacturing robot may typically include a scanning function 1815 and the scanning function may be used to characterize a roadway, driveway, parking lot or other surface that the composite Addibot may act upon. The composite Addibot may also include a seal coating function 1835. The composite Addibot may include a pressurized washing system 1830. The composite Addibot may also include a brushing function 1850 which may be used in some cases to sweep a surface as a pretreatment and to spread material such as seal coating or crack fill after application. The sweeping function may also include a vacuum cleaning function or a pressurized gas or air function as well. In some examples a weighted vibrational roller (not shown) may also be included. In some examples a routing or milling implement (not shown) may also be included.

Referring to FIG. 18B, in some examples, a composite Addibot may be teamed with a camera equipped drone 1880 to control processing on a roadway, driveway, or parking lot. The camera equipped drone 1880 may be used to create an aerial map of a region to be treated. If the camera equipped drone 1880 surveys the region under use, the existing rough topography, traffic flow, parking layout, large scale defectiveness, painted line layout and the like may be assessed.

Referring to FIG. 18C, an exemplary aerial survey 1870 is illustrated. The survey region may be any region with a roadway, driveway, parking lot or the like, but for example a shopping center parking lot is depicted. In some examples, a user of the composite Addibot 1810 with camera equipped drone 1880 may survey a future work area with the camera equipped drone 1880 in advance of performing the work. The exemplary aerial survey 1810 for example may show the presence of cars or other vehicles in parking locations. Whereas, during the performance of work activities the region may be blocked off from such elements. The survey may best be obtained during a daylight condition and may also be desirable when the sky is not overcast. Although it may be desirable to perform the survey during daylight, it is possible for Addibots to function during night-time conditions.

Alignment features may be laid, deposited, affixed, or painted upon the region under study such as a first 1871, second 1872, and third 1873 alignment feature which may be used as a part of the navigation system and may be used to register a model of the parking lot between models created by the aerial survey for example and the physical location itself.

The aerial survey 1870 may also show buildings 1874 and parking spots 1875. A user may marry an aerial survey 1870 with tax maps or real estate title maps to determine boundaries 1876 of the property. The user may do this through an interface provided with processing software by a controller. The controller may be a portion of the composite Addibot or a separate computer or controller which has an ability of transferring data to the controller of an Addibot such as the composite Addibot. The operator may also create a design for locations of line markings to be laid down after repair, resurfacing or new surfacing activities are complete. In the design, the survey location may be used to lay the lines in a nearly identical fashion, or the user may create a new pattern design. A portion of previously lined parking spaces may be discarded as indicated by the markings 1877 on the survey. Although the survey may be obtained with camera equipped drone, it is also possible that other sources of the equivalent imagery such as other aerial surveys or satellite surveys may be imported into a design system for Addibots.

Figure 18D:
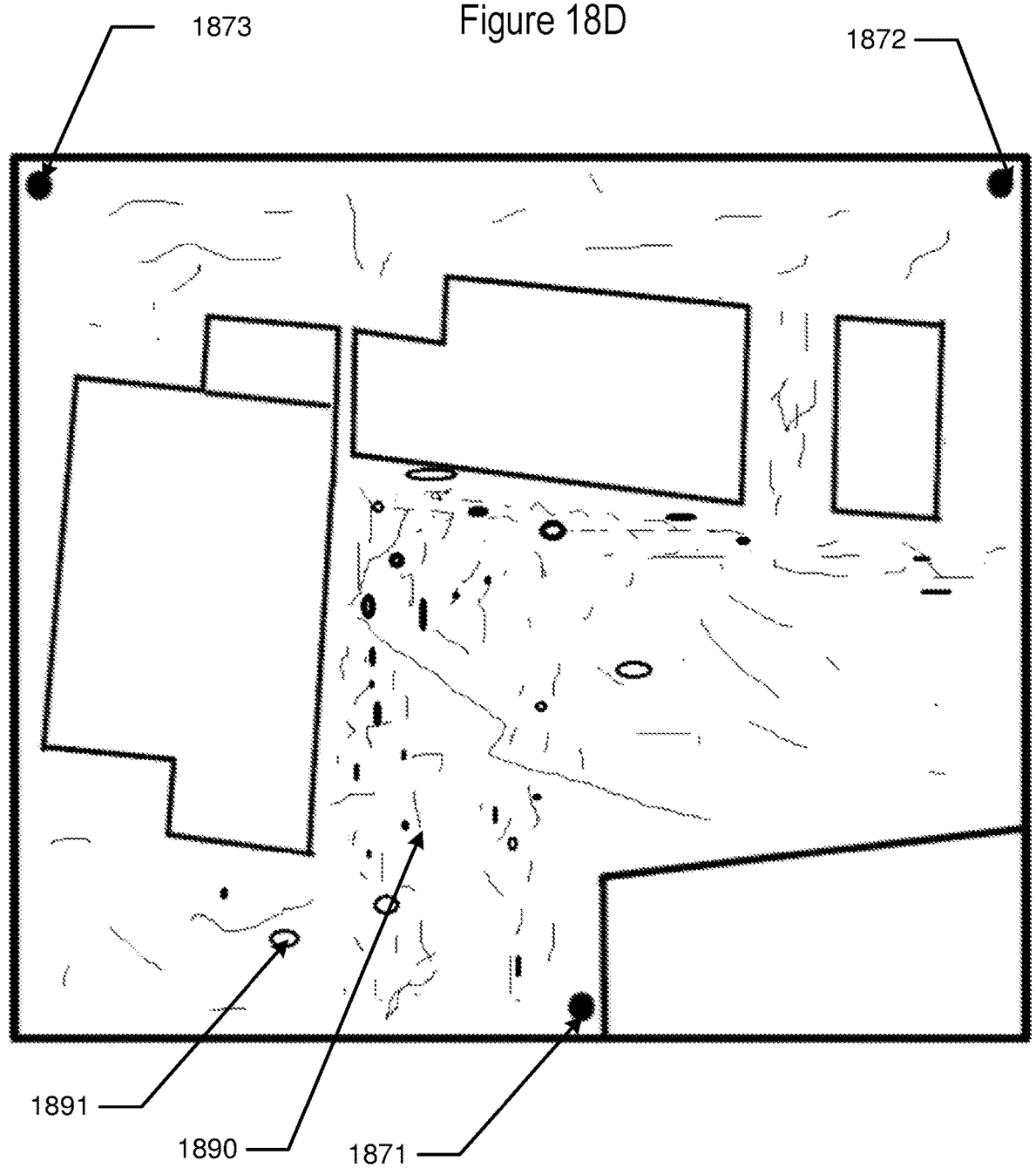
FIG. 18D illustrates mapping of detected cracks and potholes upon an aerial survey result that may be used in treating a region of the survey.

During the course of working on the region that has been surveyed, there may be numerous types of repairs to cracks and potholes and defects of the like that may be made. The Addibot may retain location information relating to the various defects which may be stored into a database of the Addibot. The location of the defects may likewise be stored with categorization of the type and class of defect where the location may be as determined by the Addibots' navigation system or other location systems. Referring to FIG. 18D the data may be associated with the survey data and a map type portrayal may be made of the defect locations such as cracks 1890 or potholes 1891 relative to the first 1871, second 1872 and third 1873 reference positions or any other number thereof.

In some examples, a prior repair map may be used to drive preventive maintenance activities before the entire lot is again worked on. The crack repairs could be studies and maintained at a later date for example. In other examples, the prior repair maps may be used to design strengthened regions in future repaving activities. Whether the top asphalt layers are covered or removed, the existence of cracks and potholes may be correlated to better future performance when an Addibot prints strengthening regions upon the roadway surface before new pavement is applied. In some examples, structures of materials that may melt into asphalt blacktop or other surface materials may be strengthened with carbon nanotubes and other strengthening agents as have been described previously.

While the disclosure has been made in conjunction with specific examples, it is evident that many alternatives, modifications, and variations will be apparent to those skilled in the art considering the foregoing description. Accordingly, this description is intended to embrace all such alternatives, modifications and variations as fall within its spirit and scope. Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed invention. Moreover, although features may be described above as acting in certain combinations and even initially claimed as such, one or more features from a claimed combination can in some cases be excised from the combination, and the claimed combination may be directed to a sub-combination or variation of a sub-combination.

In some examples of roadway construction and repair and construction of walls, the additive manufacturing components of an Addibot may have been described in relationship to extrusion apparatus with molding forms to form the extruded material. There may be other additive manufacturing techniques such as extrusion from spatially controlled nozzles and other additive manufacturing techniques. In some examples of the creation of structures, the formation of walls has been described, there may be numerous structures that may be created in similar methods consistent with the present disclosure, such as sculptures and foundations as non-limiting examples.

Moreover, the separation of various system components in the embodiments described above should not be understood as requiring such separation in all embodiments. Examples of Addibots may include all system components or a subset of components and may act in multiples to perform various functions. Thus, while particular embodiments of the subject matter have been described, other embodiments are within the scope of the following claims.

What is claimed is:

1. A method of repairing a roadway or a parking lot, the method comprising:
    placing at least three alignment features upon the roadway or the parking lot, wherein the at least three alignment features are visibly distinct from the roadway or the parking lot;
    surveying the roadway or the parking lot, wherein the surveying comprises scanning a surface of the roadway or the parking lot for defects and for the at least three alignment features and recording location information along with scan data;
    processing a datafile resulting from the surveying to determine a first model of locations to repair, wherein the first model of locations to repair is calibrated to the location information of the at least three alignment features;
    moving a mobile additive manufacturing robot upon of the roadway or the parking lot, wherein a movement is based upon the first model of locations to repair;
    preparing the surface of the roadway or the parking lot for a repair process with the mobile additive manufacturing robot; and
    repairing the defects in the surface of the roadway or the parking lot with the mobile additive manufacturing robot.

2. The method of claim 1 wherein the surveying is performed at least in part utilizing an aerial drone.

3. The method of claim 1 wherein the surveying is performed at least in part by one or more mobile additive robots each equipped with a vision system to scan the surface as the mobile additive robots move over it.

4. The method of claim 1 wherein the survey datafile is communicated to a remote server for processing to form the first model of locations to repair.

5. The method of claim 4 wherein the remote server processes the survey datafile utilizing artificial intelligence algorithms.

6. The method of claim 5 where in the remote server comprises at least a first AI processing chip to process the survey datafile.

7. The method of claim 3 wherein at least a first mobile additive robot comprises an AI processing chip to process data received from the vision system.

8. The method of claim 1 wherein the repairing of the defects comprises depositing a sealing material into a crack feature.

9. The method of claim 1 wherein the repairing of the defects comprises depositing a seal coating material upon the surface.

10. The method of claim 1 wherein the repairing of the defects comprises depositing a plurality of discrete material elements upon the surface.

11. The method of claim 10 wherein the plurality of discrete material elements comprise:
    an inner core;
    a first coating layer comprising an adhesive, wherein the first coating layer surrounds the inner core; and
    a second solid coating layer surrounding the first coating layer, wherein the second solid coating layer prevents the plurality of discrete material elements from binding to surrounding material while the plurality of discrete material elements are in a material storage hopper.

12. The method of claim 1 further comprising surveying the roadway or the parking lot to analyze a movement of traffic.

13. The method of claim 12 where the analyzing of the movement of traffic provides input to a creation of a second model, wherein the second model comprises a location of line features upon the surface of the roadway or the parking lot.

14. The method of claim 13 wherein an artificial intelligence algorithm is utilized in the creation of the second model.

15. The method of claim 13 wherein the location of line features is derived by optimizing a flow of traffic.

16. The method of claim 15 wherein the line features are applied to the surface by spray painting.

17. The method of claim 15 wherein the line features are applied to the surface by heating a thermoplastic substrate of a line feature.

18. The method of claim 15 wherein the line features comprise an electrically conductive material.

19. The method of claim 15 wherein the optimized flow of traffic is used to generate a third model, wherein the third model defines locations to add strengthening material to the surface of the roadway or the parking lot.

20. The method of claim 19 further comprising:
adding the strengthening material to the surface of the roadway or the parking lot; and
covering the deposited strengthening material with an asphalt layer.

* * * * *